(12) United States Patent
Cheng et al.

(10) Patent No.: US 6,342,565 B1
(45) Date of Patent: Jan. 29, 2002

(54) ELASTIC FIBERS AND ARTICLES MADE THEREFROM, INCLUDING CRYSTALLINE AND CRYSTALLIZABLE POLYMERS OF PROPYLENE

(75) Inventors: Chia Yung Cheng, Seabrook; Sudhin Datta; Pawan Kumar Agarwal, both of Houston, all of TX (US)

(73) Assignee: ExxonMobil Chemical Patent Inc., Houston, TX (US)

( * ) Notice: Subject to any disclaimer, the term of this patent is extended or adjusted under 35 U.S.C. 154(b) by 0 days.

(21) Appl. No.: 09/570,584

(22) Filed: May 12, 2000

Related U.S. Application Data

(60) Provisional application No. 60/133,958, filed on May 13, 1999.

(51) Int. Cl.$^7$ .............................. D01F 6/46; C08L 23/10
(52) U.S. Cl. ...................................... 525/191; 525/240
(58) Field of Search .................................. 525/191, 240

(56) References Cited

U.S. PATENT DOCUMENTS

| | | | |
|---|---|---|---|
| 3,256,258 A | | 6/1966 | Herrman |
| 3,282,992 A | | 11/1966 | Harris |
| 3,378,606 A | | 4/1968 | Kontos |
| 3,853,969 A | | 12/1974 | Kontos |
| 3,882,197 A | | 5/1975 | Fritz et al. |
| 3,888,949 A | | 6/1975 | Shih |
| 4,186,240 A | * | 1/1980 | Matsuda et al. ............ 428/349 |
| 4,368,565 A | | 1/1983 | Schwartz |
| 4,461,872 A | | 7/1984 | Su |
| 4,540,753 A | | 9/1985 | Cozewith et al. |
| 4,938,910 A | * | 7/1990 | Abe et al. .................... 264/236 |
| 5,057,475 A | | 10/1991 | Canich et al. |
| 5,145,819 A | | 9/1992 | Winter et al. |
| 5,153,157 A | | 10/1992 | Hlatky et al. |
| 5,198,401 A | | 3/1993 | Turner et al. |
| 5,239,022 A | | 8/1993 | Winter et al. |
| 5,243,001 A | | 9/1993 | Winter et al. |
| 5,276,208 A | | 1/1994 | Winter et al. |
| 5,290,886 A | | 3/1994 | Ellul |
| 5,296,434 A | | 3/1994 | Karl et al. |
| 5,304,614 A | | 4/1994 | Winter et al. |
| 5,329,033 A | | 7/1994 | Apaleck et al. |
| 5,374,752 A | | 12/1994 | Winter et al. |
| 5,397,832 A | | 3/1995 | Ellul |
| 5,486,419 A | * | 1/1996 | Clementini et al. ......... 428/397 |
| 5,510,502 A | | 4/1996 | Sugano et al. |
| 5,594,080 A | | 1/1997 | Waymouth et al. |
| 5,672,668 A | | 9/1997 | Winter et al. |

FOREIGN PATENT DOCUMENTS

| | | |
|---|---|---|
| EP | 0 549 900 B1 | 8/1996 |
| EP | 0 576 970 B1 | 1/1998 |
| WO | WO 99/07788 | 2/1999 |
| WO | WO 00/01766 | 1/2000 |

OTHER PUBLICATIONS

"Near Monodisperse Ethylene–Propylene Copolymers by Direct Ziegler–Natta Polymerization. Preparation, Characteristization, Properties", Ver Strate, et al, Macromolecules, vol. 21 No. 12, p. 3360–3371, Dec. 1988.

"Elastomeric Polypropylenes from Alumina–Supported Tetraalkyl Group IVB Catalyst. 1. Synthesis and Properties of High Molecular Weight Stereoblock Homopolymers", Collette, et al, Macromolecules, vol. 22, No. 10, p.. 3851–3866, Oct. 1989.

"Two–State Propagation Mechanism for Propylene Polymerization Catalyzed by rec–[anti–Ethylidene(1–$\eta^5$–tetramethylcyclopentadienyl)(1–$\eta^5$–indenyl)]dimethyltitanium", Chien, et al, Journal of American Chemical Society, vol. 113, No. 22, p. 8569–8570, Oct. 23, 1991.

"Stereoblock Polypropylene: Ligand Effects on the Stereospecificity of 2–Arylindene Zirconocene Catalyst", Hauptman, et al, Journal of the American Chemical Society, vol. 117, No. 46, p. 11586–11587, Nov. 22, 1995.

"Elastomeric Poly(propylene): Influence of Catalyst Structure and Polymerization Conditions on Polymer Structure and Properties" Gauthier, et al, Macromolecules, vol. 28, No. 11, p. 3771–3778, May 22, 1995.

"Modeling Nonheme Diiron Enzymes: Hydrocarbon Hydroxylation and Desaturation by a High–Valent $Fe_2O_2$ Diamond Core", Kim, et al, Journal of the Americaan Chemical Society, vol. 119, No. 15, p. 3635–3636, Apr. 16, 1997.

\* cited by examiner

*Primary Examiner*—Nathan M. Nutter
(74) *Attorney, Agent, or Firm*—William G. Muller; Paige Schmidt

(57) ABSTRACT

Improved thermoplastic polymer soft elastic fiber blend compositions including a crystalline isotactic polypropylene component and a crystallizable alpha-olefin and propylene copolymer component, the copolymer comprising crystallizable alpha-olefin sequences. In a preferred embodiment, improved thermoplastic polymer blends are provided prepared from 0% to 95%, preferably 2% to 40% of the crystalline isotactic polypropylene and from 5% to 100%, preferably 60% to 98% of a crystallizable ethylene and propylene copolymer, wherein said copolymer comprises isotactically crystallizable propylene sequences and is predominately propylene. The resultant blends manifest unexpected compatibility characteristics, increased tensile strength, and, improved resistance to elastic deformation.

13 Claims, 3 Drawing Sheets

ELASTIC FIBERS AND ARTICLES MADE THEREFROM, INCLUDING CRYSTALLINE AND CRYSTALLIZABLE POLYMERS OF PROPYLENE

RELATED APPLICATIONS

This application claims priority to and fully incorporates by reference U.S. patent application Ser. No. 60/133,958, filed May 13, 1999.

TECHNICAL FIELD

The invention relates to an elastic fiber including at least one and preferably two polyolefin thermoplastic components.

BACKGROUND

Ethylene—propylene copolymers and blends of isotactic polypropylene and ethylene propylene rubber are well known in the prior art. However, the traditional Ziegler-Natta catalysts used to make the ethylene propylene elastomer have limitations. Thus polymers which are simultaneously uniform in compositional distribution, have substantially stereospecific propylene residues and have less than 35 wt. % ethylene are not available with these catalysts. These limitations in the synthesis have lead to the absence of elastic fibers from blends of ethylene propylene copolymers and isotactic polypropylene.

U.S. Pat. No. 3,882,197 suggests blends of stereoregular propylene/alpha-olefin copolymers, stereoregular propylene, and ethylene copolymer rubbers.

U.S. Pat. No. 3,888,949 suggests the synthesis of blend compositions containing isotactic polypropylene and copolymers of propylene and an alpha-olefin, containing between 6–20 carbon atoms, which have improved elongation and tensile strength over either the copolymer or isotactic polypropylene. Copolymers of propylene and alpha-olefin are described wherein the alpha-olefin is hexene, octene or dodecene. However, the copolymer is made with a heterogeneous titanium catalyst resulting in copolymers with non-uniform composition distribution and a broad molecular weight distribution. Non-uniform intramolecular compositional distribution is evident in U.S. Pat. No. 3,888,949 by the use of the term "block" in the description of the polymer where the copolymer is described as having "sequences of different alpha-olefin content." Within the context of the invention described above the term sequences describes a number of olefin monomer residues linked together by chemical formed during polymerization.

U.S. Pat. No. 4,461,872, improved on the properties of the blends described in U.S. Pat. No. 3,888,949 by using another heterogeneous catalyst system which is expected to form copolymers which have statistically significant intermolecular and intramolecular compositional differences.

Two successive publications in the journal of Macromolecules, 1989, V22, pages 3851–3866 described blends of isotactic polypropylene and partially atactic polypropylene which purportedly have desirable tensile elongation properties. However, the partially atactic polypropylene has a broad molecular weight distribution as shown in FIG. 8 of the first publication. The partially atactic polypropylene is also composed of several fractions, which differ in the level of tacticity of the propylene units as shown by the differences in the solubility in different solvents. This is shown by the corresponding physical decomposition of the blend which is separated by extraction with different solvents to yield individual components of uniform solubility characteristics as shown in Table IV of the above publications.

More recently several authors have shown the formation of more refined structures of partially atactic, partially isotactic polypropylene which have elastomeric properties. It is believed that in these components each molecule consists of portions which are isotactic and therefore crystallizable while the other portions of the same polypropylene molecule are atactic and therefore amorphous and not crystallizable. Examples of these propylene homopolymers containing different levels of isotacticity in different portions of the molecule are described in U.S. Pat. No. 5,594,080, in the article in the Journal American Chemical Society (1995), 117, p. 11586, in the article in the Journal American Chemical Society (1997), 119, p. 3635, in the journal article in the Journal of the American Chemical Society (1991), 113, pp. 8569–8570, and in the journal article in the Journal Macromolecules (1995), 28, pp. 3771–3778. These articles describe the copolymer of the present composition but do not describe the compositions obtained in blends with a more crystalline polymer such as isotactic polypropylene, nor its resultant desirable physical properties.

U.S. Pat. Nos. 3,853,969 and 3,378,606, suggest the formation of in situ blends of isotactic polypropylene and "stereo block" copolymers of propylene and another olefin of 2 to 12 carbon atoms, including ethylene and hexene. The copolymers of this invention are necessarily heterogeneous in intermolecular and intramolecular composition distribution. This is demonstrated by the synthesis procedures of these copolymers which involve sequential injection of monomer mixtures of different compositions to synthesize polymeric portions of analogously different compositions. In addition, FIG. 1 of both patents shows that the "stereo block" character, which is intra or intermolecular compositional differences in the context of the description of the present invention, is essential to the benefit of the tensile and elongation properties of the blend of these patents. Moreover, all of these compositions either do not meet all of the desired properties for various applications.

Similar results are purportedly achieved in U.S. Pat. No. 3,262,992 wherein the authors suggest that the addition of a stereoblock copolymer of ethylene and propylene to isotactic polypropylene leads to improved mechanical properties of the blend compared to isotactic polypropylene alone. However, these benefits are described only for the stereoblock copolymers of ethylene and propylene. These copolymers were synthesized by changing the monomer concentrations in the reactor with time. This is shown in examples 1 and 2. The stereoblock character of the polymer is graphically shown in the molecular description (column 2, line 65) and contrasted with the undesirable random copolymer (column 2, line 60). The presence of stereoblock character in these polymers is shown by the high melting point of these polymers and the poor solubility in hydrocarbons at ambient temperature.

Notwithstanding these descriptions of the polymer blends containing isotactic propylene segments it is apparent that useful articles such as elastic fibers have not been constructed from any of these materials. The utility of elastic fibers is that they (a) are soft to the touch, and (b) can recover partly from temporary tensile deformation to less than 100% increase in their original length, this latter affording the wearer of garments based on such fibers more comfort. In addition, there is a need for elastic fibers which are easily processible in conventional thermoplastic plastics fiber equipment using conditions similar to that used for conventional thermoplastic fibers. Further, any or all of the conventional processes used for fiber fabrication should be usable to fabricate the elastic fiber blend. These include but are not limited to the following: continuous filament, bulked continuous filament, staple fibers, melt blown fibers, spun bonded fibers. It is also further desirable to have elastic fibers composed essentially completely of polyolefins such that they are thermally stable, heat resistant, light resistant and generally suitable for thermoplastic applications.

SUMMARY

There is a need therefore for soft elastic fibers composed generally essentially completely of polyolefins but having simultaneously a crystalline stereospecific polypropylene component to obtain good tensile strength as well as a crystallizable ethylene-propylene copolymer to provide good elastic recoverability, resistance to elastic flow at a load sustained for specified period as well as a glass transition temperature below that of polypropylene.

Embodiments of our invention include forming soft elastic fibers from predominantly crystallizable, semicrystalline polyolefin copolymers. Further embodiments include improving the aforementioned properties of fibers by blending a generally minor amount of a crystalline polyolefin where the type of crystallinity of the two components are similar, as for instance both will be substantially isotactic or substantially syndiotactic. Isotactic and syndiotactic arrangement of monomers in a polymer are defined in "Principles of Polymerization" by G. Odian ($3^{rd}$ Ed) 1991, p. 607 (John Wiley) which is incorporated herein by reference. Substantially pertains to an arrangement of monomer units where greater than 50% of adjacent monomer units have the defined tacticity. Other embodiments of our invention are directed to polyolefins and polyolefin blends where the crystallizable and crystalline components have a stereoregular polypropylene component, especially isotactic polypropylene. A crystalline polymer is one with a heat of fusion, as measured by DSC, to be greater than 50 J/g. A crystallizable polymer is one, with a heat of fusion, as measured by DSC, to be less than 50 J/g. In the semicrystalline, crystallizable copolymer this is achieved with a copolymer of propylene and a $C_2$, $C_3$—$C_{20}$ alphaolefin, preferably propylene and at least one other alphaolefin having 6 or less carbon atoms, and more preferably propylene and ethylene. Improvements in the properties of the semicrystalline, crystallizable copolymer can be obtained by blending it with the crystalline stereoregular polypropylene component, particularly isotactic polypropylene. This crystallizable copolymer is less crystalline than the isotactic crystalline polypropylene. The crystallizable copolymer has a substantially uniform composition distribution, preferably as a result of polymerization with a metallocene catalyst. Composition distribution is a property of copolymers indicating a statistically significant intermolecular or intramolecular difference in the composition of the polymer. Methods for measuring compositional distribution are described later.

We have found that a crystallizable, semicrystalline propylene alpha olefin copolymer, hereinafter referred to as the "first polymer component" (FPC) can be used for elastic fibers. The properties of the fiber can be improved by blending an amount of a crystalline propylene polymer, hereinafter referred to as the "second polymer component", (SPC). These blends have advantageous processing characteristics while still providing a fiber or fibers having decreased flexural modulus and increased adjusted or normalized load capacity and low values of set and load decay.

Soft fibers are those which have a 1% secant modulus less than 25,000 psi in/in, more preferably less than 12,000 psi in/in. It is desirable to have set less than 130% on elongation of the fibers to 400%. The decrease in set and load decay refer to the ability of the elastic fiber to withstand instantaneous and sustained loads, respectively, without deformation.

It is possible to have a third polymeric component which is another crystallizable propylene alpha olefin copolymer indicated as FPC2 in the text below which has crystallinity intermediate between the FPC and the SPC. The FPC2 also has a narrow composition distribution and is made with a metallocene catalyst. The addition of FPC2 leads to a liner morphology of dispersion of the FPC and improvements in some of the properties of the blend of FPC and SPC.

The fibers made from these blends are made by extrusion of the molten polymer through a die as described below, which may be followed by drawing, crimping and/or thermal annealing by any of the other procedures known to the art. Typically, these fibers are between 0.1 to 50 denier in thickness.

According to another embodiment a thermoplastic polymer blend for the preparation of the elastic fiber composition of the invention comprises a SPC and a FPC with added process oil. The SPC comprises isotactic polypropylene, a reactor copolymer or an impact copolymer as described above and is present in an amount of 0% to 95% by weight and more preferably 2% to 70% by weight of the total weight of the blend. The balance of the polymer composition consists of a mixture of the process oil and the FPC and FPC2 if used.

Embodiments of our invention also include a soft, set-resistant, annealed fiber comprising a blend of polyolefins, the blend of polyolefinis being substantially non crosslinked. The blend including a first polymer component (FPC), the FPC has:

i) a composition distribution such that at least 75 weight percent of the polymer is isolated in two adjacent soluble fractions, each of these fractions has a composition difference of no greater than 20% (relative) of the average weight percent ethylene content of the whole first polymer component;

ii) a melting point, as determined by DSC less than 105° C.;

iii) a heat of fusion less than 45 J/g;

iv) propylene and an α-olefin present, wherein the α-olefin is present in said FPC from 5–40 weight %, wherein the α-olefin is selected from the group consisting of ethylene and $C_4$–$C_{12}$ alpha-olefins, propylene making up the balance of the FPC; wherein the FPC is present in the blend from 5–100% by weight.

A second polymer component (SPC), said SPC being a crystalline polymer having:

i) a melting point above 110° C.;

ii) a heat of fusion above 60 J/g;

iii) propylene present at least 90 weight %, and an α-olefin present at less than 9 weight %, the total of the propylene and the α-olefin being 100 weight %.

iv) The SPC being present in the blend from 0–95 weight percent, and wherein the fiber exhibits a resistance to set equal to or less than 150% from a tensile deformation of 400%, wherein the blend of polyolefins in said fiber has a flexural modulus equal to or less than 25,000 psi in/in, and may be elongated to 300% in the substantial absence of breakage.

The benefits of embodiments of our invention include improvement in the elastic recovery and the flexural modulus of the elastic fiber made from the blend. These improvements in elastic recovery are most apparent for 400% tensile extension of the fiber. Historically, the examples of the prior art have not been able to duplicate either the extensibility of the fiber to 400% or any significant portion of the elastic recovery of the polymer fiber.

These and other features, aspects and advantages of the present invention will become better understood with reference to the following description and appended claims.

DETAILED DESCRIPTION

Figure 1:
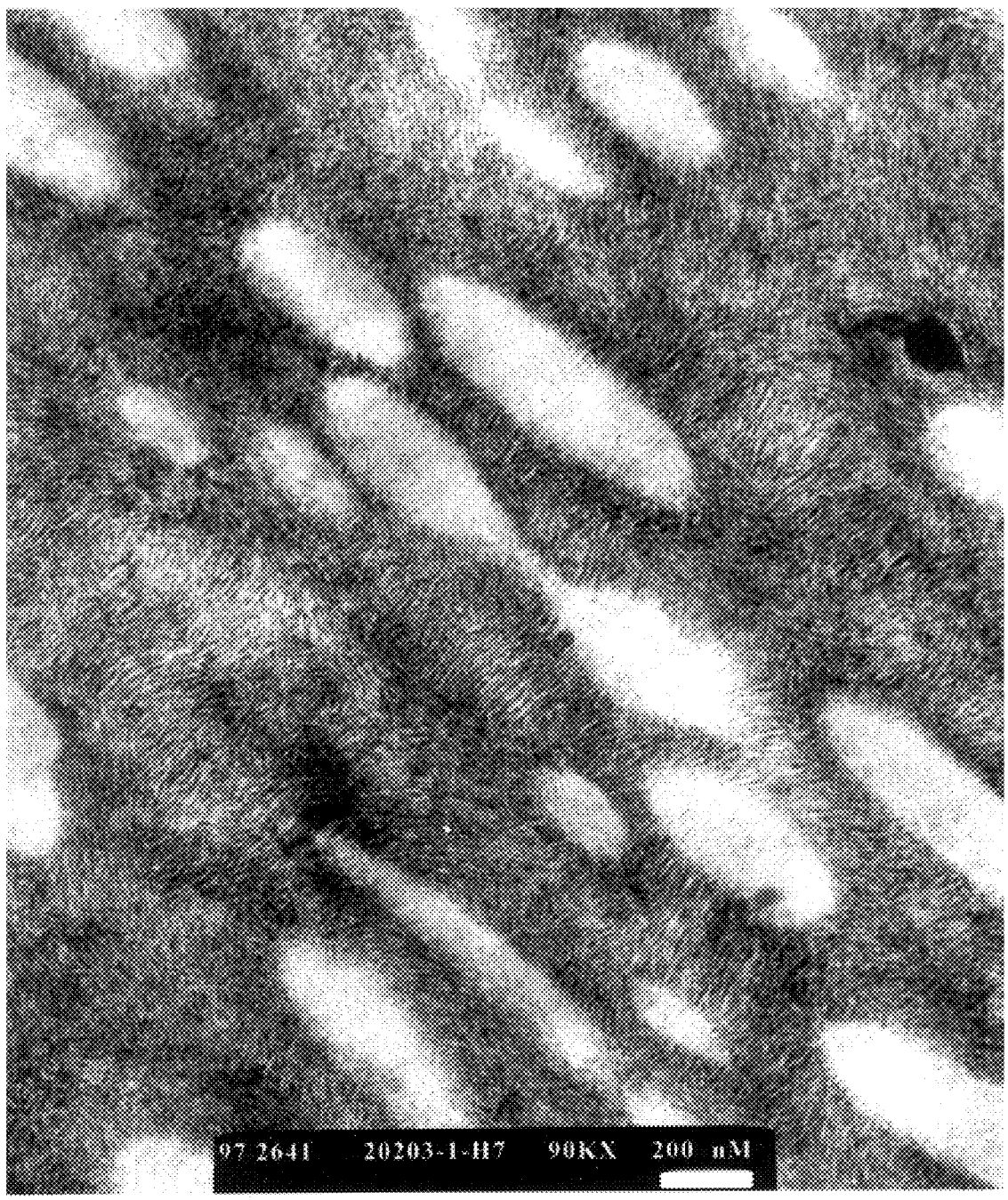
FIG. 1 is a composition of the invention blend comprising 78% of FPC and the balance of SPC.

The soft elastic fiber compositions of embodiments of our invention generally are comprised of a crystallizable FPC comprising an alpha-olefin (other than propylene) and propylene copolymer. Soft fibers are those which have a 1% secant modulus less than 25,000 psi in/in, more preferably less than 12,000 psi in/in. Another embodiment of the invention is the addition of a crystalline SPC comprising isotactic polypropylene. Yet another embodiment of our invention contains a crystallizable FPC2 comprising an alpha-olefin (other than propylene) and propylene copolymer. Other embodiments of the invention may include an additional component, a process oil.

The First Polymer Component (FPC)

The FPC of the polymer blend compositions of the present invention comprises a crystallizable copolymer of propylene and another alpha-olefin having less than 10 carbon atoms, preferably ethylene. The crystallinity of the FPC arises from crystallizable stereoregular propylene sequences. The FPC has the following characteristics:

(A) The FPC of the present invention preferably comprises a random copolymer having a narrow compositional distribution. The term "crystallizable," as used herein for FPC, describes those polymers or sequences which are mainly amorphous in the undeformed state, but can crystallize upon stretching, annealing or in the presence of a crystalline polymer. Crystallization is measured by DSC, as described herein. While not meant to be limited thereby, it is believed that the narrow composition distribution of the first polymer component is important. The intermolecular composition distribution of the polymer is determined by thermal fractionation in a solvent. A typical solvent is a saturated hydrocarbon such as hexane or heptane. This thermal fractionation procedure is described below. Typically, approximately 75% by weight and more preferably 85% by weight of the polymer is isolated as a one or two adjacent, soluble fraction with the balance of the polymer in immediately preceding or succeeding fractions. Each of these fractions has a composition (wt. % ethylene content) with a difference of no greater than 20 wt. % (relative) and more preferably 10 wt. % (relative) of the average wt. % ethylene content of the whole first polymer component. The first polymer component is narrow in compositional distribution if it meets the fractionation test outlined above.

(B) In all FPC, the length and distribution of stereoregular propylene sequences is consistent with the substantially random statistical copolymerization. It is well known that sequence length and distribution are related to the copolymerization reactivity ratios. By substantially random, we mean copolymer for which the product of the reactivity ratios is 2 or less. In stereoblock structures, the average length of PP sequences is greater than that of substantially random copolymers with a similar composition. Prior art polymers with stereoblock structure have a distribution of PP sequences consistent with these blocky structures rather than a random substantially statistical distribution. The reactivity ratios and sequence distribution of the polymer may be determined by C-13 NMR which locates the ethylene residues in relation to the neighboring propylene residues. To produce a copolymer with the required randomness and narrow composition distribution, it is desirable to use (1) a single sited catalyst and (2) a well-mixed, continuous flow stirred tank polymerization reactor which allows only a single polymerization environment for substantially all of the polymer chains of the first polymer component.

(C) The FPC preferably has a single broad melting transition. This is determined by DSC. These FPC polymers have a melting point of less than 105° C., preferably less than 100° C. and a heat of fusion of less than 45 J/g, preferably less than 35 J/g, more preferably less than 25 J/g, as determined by DSC. Typically a sample of the FPC will show secondary melting peaks adjacent to principal peak: these are considered together as single melting point. The highest of the peaks is considered the melting point. Generally, the FPC of the present invention has a melting point below the second polymer component of the blend between 105° C. and 0° C. Preferably, the melting point of FPC is between 90° C. and 20° C. Most preferably, according to one embodiment of the present invention, the melting point of the FPC of the composition of the present invention is between 70° C. and 25° C.

(D) The FPC of the present inventive composition comprises isotactically crystallizable alpha-olefin sequences, e.g., preferably propylene sequences (NMR). The crystallinity of the first polymer component is, preferably, according to one embodiment, from 1% to 65% of homoisotactic polypropylene, preferably between 3% to 30%, as measured by the heat of fusion of annealed samples of the polymer.

(E) The molecular weight of the FPC can be between 10,000 to 5,000,000, preferably 80,000 to 500,000, with a poly dispersity index (PDI) between 1.5 to 40.0, more preferably between 1.8 to 5 and most preferably between 1.8 to 3. It is preferred if the FPC has a ML (1+4)@125° C. less than 100, more preferably less than 75 and most preferably less than 60.

(F) The low levels of crystallinity in the FPC are obtained by incorporating from 5% to 40% by weight alpha-olefin, preferably from 6% to 30% by weight alpha-olefin, and more preferably, it comprises from 8% to 25% by weight alpha-olefin and even more preferably between 8% to 20%, most preferably between 10 to 15% by weight alpha-olefin and an average propylene content by weight of at least 60% and more preferably at least 75%. These composition ranges for the FPC are dictated by the object of the present invention. Alpha olefins comprise one or more members of the group $C_2$, $C_3$–$C_{20}$ alpha-olefin. At alpha-olefin compositions lower than the above lower limits for the composition of the FPC, the blends of the SPC and FPC are thermoplastic and do not have the phase separated morphology required for the tensile recovery properties of the blends. At alpha-olefin compositions higher than the above higher limits for the FPC, the blends have poor tensile strength and a phase separated morphology with a coarse dispersion. It is believed, while not meant to be limited thereby, the FPC needs to have the optimum amount of isotactic polypropylene crystallinity to crystallize with the SPC for the beneficial effects of the present invention. As discussed above, the preferred alpha-olefin is ethylene.

(G) The blends of the present invention may comprise from 5%–100% by weight of the FPC and from 0%–95% by weight of the SPC. Preferably, the blends include from 30%–98%, more preferably 60%–98% and most preferably 75–98% by weight of the FPC. In blends containing the FPC2 the amount of the FPC2 is included in FPC fraction for the ratios of the relative amounts of crystalline and crystallizable polymer.

(H) More than one FPC may be used in a single blend with a SPC. Each of the FPC is described above and the number of FPC in this embodiment is generally less than three and more preferably, two. The different FPC differ in their crystallinity. The less crystalline portion is the FPC while the more crystalline portion is the FPC2. The FPC2 has, preferably, according to one embodiment, from 20%–65%, preferably between 25%–65% of the crystallinity of homoisotactic polypropylene as measured by the heat of fusion of annealed samples of the polymer. The FPC and the FPC2 may also differ in their molecular weight. In this embodiment of the invention the FPC and FPC2 differ in the alpha-olefin type or amount, consistent with the formation of the FPC of different crystallinity content. The preferred alpha-olefin is ethylene. The resultant morphology consists of a finer dispersion of the highly crystalline component with the continuous phase of the less crystalline phase. Such a morphology leads to in the elastic recovery properties of the blends. FPC2, describes those polymers or sequences which are substantially crystalline in the undeformed state. Further crystallization may also occur in the presence of the crystalline polymer such as SPC. These FPC2 polymers have a melting point of less than 115° C. or preferably less than 100° C. and a heat of fusion of less than 75 J/g, preferably less than 70 J/g, more preferably less than 65 J/g, as determined by DSC. The heat of fusion of all samples, including the individual FPC components is measured by DSC, according to procedures described herein.

The first polymer component may also comprise a copolymer of atactic propylene and isotactic propylene. Such crystallizable homopolymers of propylene have been described in U.S. Pat. No. 5,594,080. Optionally, the FPC of the blends of the present invention may comprise a diene. The amount of diene is preferably less than 10 wt. % and preferably less than 5 wt %. The diene may be selected from the group consisting of those which are used for the vulcanization of ethylene propylene rubbers and preferably ethylidene norbornene, vinyl norbornene and dicyclopentadiene.

Generally, without limiting in any way the scope of the invention, one means for carrying out a process of the present invention for the production of the copolymer FPC is as follows: (1) liquid propylene is introduced in a stirred-tank reactor, (2) the catalyst system is introduced via nozzles in either the vapor or liquid phase, (3) feed ethylene gas is introduced either into the vapor phase of the reactor, or sparged into the liquid phase as is well known in the art, (4) the reactor contains a liquid phase composed substantially of propylene, together with dissolved alpha-olefin, preferably ethylene, and a vapor phase containing vapors of all monomers, (5) the reactor temperature and pressure may be controlled via reflux of vaporizing propylene (autorefrigeration), as well as by cooling coils, jackets, etc., (6) the polymerization rate is controlled by the concentration of catalyst, temperature, and (7) the ethylene (or other alpha-olefin) content of the polymer product is determined by the ratio of ethylene to propylene in the reactor, which is controlled by manipulating the relative feed rates of these components to the reactor.

For example, a typical polymerization process comprises a polymerization in the presence of a catalyst comprising a chiral bis (cyclopentadienyl) metal compound and either 1) a non-coordinating compatible anion activator, or 2) an alumoxane activator. An exemplary catalyst system is described in U.S. Pat. No. 5,198,401 which is herein incorporated by reference for purposes of U.S. practice. Prochiral catalysts suitable for the preparation of crystalline and semi-crystalline polypropylene copolymers include those described in U.S. Pat. Nos. 5,145,819; 5,304,614; 5,243,001; 5,239,022; 5,329,033; 5,296,434; 5,276,208; 5,672,668; 5,304,614; and 5,374,752; and EP 549 900 and 576 970, all incorporated herein by reference. Additionally, metallocenes such as those described in U.S. Pat. No. 5,510,502 (incorporated herein by reference) are suitable for use in this invention.

The alumoxane activator is preferably utilized in an amount to provide a molar aluminum to metallocene ratio of from 1:1 to 20,000:1 or more. The non-coordinating compatible anion activator is preferably utilized in an amount to provide a molar ratio of biscyclopentadienyl metal compound to non-coordinating anion of 10:1 to 1:1. The above polymerization reaction is conducted by reacting such monomers in the presence of such catalyst system at a temperature of from −50° C. to 200° C. for a time of from I second to 10 hours to produce a copolymer.

According to still a further embodiment, the invention is directed to a process for preparing thermoplastic blends suitable for the preparation of elastic fibers. The process comprises: (a) polymerizing propylene or a mixture of propylene and one or more monomers selected from $C_2$ or $C_3$–$C_{20}$ alpha olefins in the presence of a polymerization catalyst wherein a substantially isotactic propylene polymer containing at least 90% by weight polymerized propylene is obtained; (b) polymerizing a mixture of ethylene and propylene in the presence of a chiral metallocene catalyst, wherein a copolymer of ethylene and propylene is obtained comprising up to 35% by weight ethylene and preferably up to 20% by weight ethylene and containing isotactically crystallizable propylene sequences; and (c) blending the propylene polymer of step (a) with the copolymer of step (b) to form a blend.

According to still a further embodiment, the invention is directed to a process for preparing of elastic fibers from these thermoplastic polymer blends. The process comprises the following: (a) generating the thermoplastic blend (as described immediately above), (b) forming the elastic fiber by extrusion through a spinneret as described in the art, (c) orienting the fiber uniaxially by extension to not greater than 700% of its original dimension and (d) annealing the resulting fibers for a period of time less than 20 days at a temperature not to exceed 170° C. The annealing and the orientation may be conducted in a single operation or as distinctive sequential operations.

While the process of embodiments of the present invention includes utilizing a catalyst system in the liquid phase (slurry, solution, suspension or bulk phase or combination thereof), gas phase polymerization can also be utilized. When utilized in a gas phase, slurry phase or suspension phase polymerization, the catalyst systems will preferably be supported catalyst systems. See, for example, U.S. Pat. No. 5,057,475 which is incorporated herein by reference for purposes of U.S. practice. Such catalyst systems can also include other well known additives such as, for example, scavengers. See, for example, U.S. Pat. No. 5,153,157 which is incorporated herein by reference for purposes of U.S. practice. These processes may be employed without limitation of the type of reaction vessels and the mode of conducting the polymerization. As stated above, and while it is also true for systems utilizing a supported catalyst system, the liquid phase process comprises the steps of contacting ethylene and propylene with the catalyst system in a suitable polymerization diluent and reacting the monomers in the presence of the catalyst system for a time and at a temperature sufficient to produce an ethylene-propylene copolymer of the desired molecular weight and composition.

The FPC and the FPC2, if used, have stereoregular propylene sequences long enough to crystallize. These stereoregular propylene sequences of FPC and FPC2 should match the stereoregularity of the propylene in the second polymer. For example, if the SPC is predominately isotactic polypropylene, then the FPC, and FPC2 if used, are copolymers having isotactic propylene sequences. If the SPC is predominately syndiotactic polypropylene, then the FPC, and the FPC2 if used, is a copolymer having syndiotactic sequences. It is believed that this matching of stereoregularity increases the compatibility of the components results in improved adhesion of the domains of the polymers of different crystallinities in the polymer blend composition. Furthermore, good compatibility is only achieved in a narrow range of copolymer composition for the FPC. Narrow intermolecular and intramolecular compositional distribution in the copolymer is preferred. The aforementioned characteristics of the FPC, and FPC2 if used, are preferably achieved by polymerization with a chiral metallocene catalyst.

The FPC is made with a polymerization catalyst which forms essentially or substantially isotactic polypropylene when all or substantially all propylene sequences in the SPC are isotactic. Nonetheless, the polymerization catalyst used for the formation of FPC will introduce stereo- and regio-errors in the incorporation of propylene. Stereo errors are those where the propylene inserts in the chain with a tacticity that is not isotactic. A regio error in one where the propylene inserts with the methylene group or the methyldiene group adjacent to a similar group in the propylene inserted immediately prior to it. Such errors are more prevalent after the introduction of an ethylene in the FPC. Thus the fraction of propylene in isotactic stereoregular sequences (e.g. triads or pentads) is less than 1 for FPC and decreases with increasing ethylene content of the FPC. While not wanting to be constrained by this theory, we suggest that the introduction of these errors in the introduction of propylene particularly in the presence of increasing amounts of ethylene are important in the use of these ethylene propylene copolymers as the FPC. Notwithstanding the presence of these errors the FPC is statistically random in the distribution of ethylene.

The FPC is made with a polymerization catalyst which forms essentially or substantially isotactic polypropylene, when all or substantially all propylene sequences in the SPC arc isotactic. The FPC is statistically random in the distribution of the ethylene and propylene residues along the chain. Quantitative evaluation of the randomness of the distribution of the ethylene and propylene sequences may be obtained by consideration of the experimentally determined reactivity ratios of the second polymer component or by 13 C NMR. The FPC is made with a single sited metallocene catalyst which allows only a single statistical mode of addition of ethylene and propylene in a well mixed, continuous monomer feed stirred tank polymerization reactor which allows only a single polymerization environment for all of the polymer chains of the FPC.

The FPC2, if used, has the same characteristics as the FPC described above. The FPC2 has a crystallinity and composition intermediate between the SPC and the FPC. In the preferred case where the FPC2 is a copolymer of ethylene and propylene while the SPC is homopolymer of propylene. The FPC2 has the same type of crystallinity of propylene as in SPC and FPC and an ethylene content in between SPC and FPC. If both SPC and FPC are composed of propylene of different levels of crystallinity the FPC2 is a propylene polymer with level of crystallinity intermediate between SPC and FPC. The addition of FPC2 to the blend leads to a better dispersion of the phases in the blend compared to blends of the similar composition which do not have any FPC2. The relative amounts of FPC and FPC2 can vary between 95:5 to 50:50 in the blend. The ratio of the SPC to the sum of FPC and FPC2 may vary in the range of 1:99 to 95:5 by weight and more preferably in the range 2:98 to 70:30 by weight.

The Second Polymer Component (SPC)

In accordance with the present invention, the SPC component i.e., the crystalline polypropylene polymer component may be homopolypropylene, or a copolymer of propylene, or some mixtures thereof. These mixtures are commonly known as reactor copolymers (RCP) or impact copolymers (ICP). The SPC has the following characteristics.

(A) The polypropylene of the present invention is predominately crystalline, i.e., it has a melting point generally greater than 110° C., preferably greater than 115° C., and most preferably greater than 130° C. The term "crystalline," as used herein for SPC, characterizes those polymers which possess high degrees of inter- and intra-molecular order. It has a heat of fusion greater than 60 J/g, preferably at least 70 J/g, more preferably at least 80 J/g, as determined by DSC analysis. Determination of this heat of fusion is influenced by treatment of the sample. If treated as discussed below, the heat of fusion of this SPC could be up to about 88 J/g.

(B) The polypropylene can vary widely in composition. For example, substantially isotactic polypropylene homopolymer or propylene copolymer containing equal to or less than 10 weight percent of other monomer, i.e., at least 90% by weight propylene can be used. Further, the polypropylene can be present in the form of a graft or block copolymer, in which the blocks of polypropylene have substantially the same stereoregularity as the propylene-alpha-olefin copolymer so long as the graft or block copolymer has a sharp melting point above 110° C. and preferably above 115° C. and more preferably above 130° C., characteristic of the stereoregular propylene sequences. The propylene polymer component may be a combination of homopolypropylene, and/or random and/or block copolymers as described herein. When the above propylene polymer component is a random copolymer, the percentage of the copolymerized alpha-olefin in the copolymer is, in general, up to 9% by weight, preferably 2%–8% by weight, most preferably 2%–6% by weight. The preferred alpha-olefins contain 2 or from 4 to 12 carbon atoms. The most preferred alpha-olefin is ethylene. One, or two or more alpha-olefins can be copolymerized with propylene Exemplary alpha-olefins may be selected from the group consisting of ethylene; butene-1; pentene-1,2-methylpentene-1,3-methylbutene-1; hexene-1,3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethyllhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-1 and hexadodecene-1.

(C) The molecular weight of the SPC can be between 10,000 to 5,000,000, preferably 50,000 to 500,000, with a poly dispersity index (PDI) between 1.5 to 40.0.

(D) The thermoplastic polymer blends of the present invention may include from 0%–95% by weight of SPC. According to a preferred embodiment, the thermoplastic polymer blends of the present invention may include from 2%–70% by weight of the SPC, more preferred 2%–40%, even more preferred 2% –25% by weight of SPC in the blend.

There is no particular limitation on the method for preparing this propylene polymer component of the invention. However, in general, the polymer is a propylene homopolymer obtained by homopolymerization of propylene in a single stage or multiple stage reactor. Copolymers may be obtained by copolymerizing propylene and an alpha-olefin having 2 or from 4 to 20 carbon atoms, preferably ethylene, in a single stage or multiple stage reactor. Polymerization methods include high pressure, slurry, gas, bulk, or solution phase, or a combination thereof, using a traditional Ziegler-Natta catalyst or a single-site, metallocene catalyst system. The catalyst used is preferably one which has a high isospecificity. Polymerization may be carried out by a continuous or batch process and may include use of chain transfer agents, scavengers, or other such additives as deemed applicable.

The crystalline polypropylene can be either homopolymer or copolymers with other alpha olefin. The SPC may also be comprised of commonly available isotactic polypropylene compositions referred to as impact copolymer or reactor copolymer. However these variations in the identity of the SPC are acceptable in the blend only to the extent that all of the components of the SPC are substantially similar in composition and the SPC is within the limitations of the crystallinity and melting point indicated above. This SPC may also contain additives such as flow improvers, nucleators and antioxidants which are normally added to isotactic polypropylene to improve or retain properties. All of these polymers are referred to as the SPC.

Process Oil

Process oil can be optimally added to the polymer blend compositions of the present invention. The addition of process oil in moderate amounts lowers the viscosity and flexibility of the blend while improving the properties of the blend at temperatures near and below 0° C. It is believed that these benefits arise by the lowering of the Tg of the blend comprising the mixture of the SPC and the FPC. Additional benefits of adding process oil to the blend of the SPC and the FPC include improved processibilty and a better balance of elastic and tensile strength are anticipated.

The process oil is typically known as extender oil in the rubber application practice. The process oils can consist of (a) hydrocarbons consisting of essentially of carbon and hydrogen with traces of hetero atoms such as oxygen or (b) essentially of carbon, hydrogen and at least one hetero atom such as dioctyl phthalate, ethers and polyethers. The process oils have a boiling point to be substantially involatile at 200° C. These process oils are commonly available either as neat solids or liquids or as physically absorbed mixtures of these materials on an inert support (e.g. clays, silica) to form a free flowing powder. We believe that all forms of these process oils are equally applicable to the description and the practice of the invention.

The process oils usually include a mixture of a large number of chemical compounds which may consist of linear, acyclic but branched, cyclic and aromatic carbonaceous structures. Another family of process oils are certain low to medium molecular weight (Molecular weight ($M_n$)<10,000) organic esters and alkyl ether esters. Examples of process oils are Sunpar® 150 and 220 from The Sun Manufacturing Company of Marcus Flook, Pa., USA and Hyprene® V750 and Hyprene V1200 from Ergon, Post Office Box 1639, Jackson, Miss. 39215-1639, USA. and IRM 903 from Calumet Lubricants Co., 10234 Highway 157, Princeton, La. 71067-9172, USA. It is also anticipated that combinations of process oils each of which is described above may be used in the practice of the invention. It is important that in the selection of the process oil be compatible or miscible with the polymer blend composition of the SPC and the FPC in the melt to form a homogenous one phase blend. It is also preferred if the process oil is substantially miscible in the FPC at room temperature.

The addition of the process oils to the mixture comprising the SPC and the FPC maybe made by any of the conventional means known to the art. These include the addition of all or part of the process oil prior to recovery of the polymer as well as addition of the process oil, in whole or in part, to the polymer as a part of a compounding for the interblending of the SPC and the FPC. The compounding step may be carried out in a batch mixer such as a mill or an internal mixer such as Banbury mixer. The compounding operation may also be conducted in a continues process such as a twin screw extruder.

The addition of certain process oils to lower the glass transition temperature of blends of isotactic polypropylene and ethylene propylene diene rubber has been described in the art by Ellul in U.S. Pat. Nos. 5,290,886 and 5,397,8392. We expect these procedures are easily applicable to the SPC and FPC mixtures of the current invention.

The SPC and FPC blend may include process oil in the range of from 1 to 50, preferably in the range of from 2 to 20 parts by weight of process oil per hundred parts of total polymer (SPC plus FPC).

The Blend of First and Second Polymer Components

The blends of SPC and FPC and other components may be prepared by any procedure that guarantees an intimate mixture of the components. For example, the components can be combined by melt pressing the components together on a Carver press to a thickness of 0.5 millimeter (20 mils) and a temperature of 180° C., rolling Lip the resulting slab, folding the ends together and repeating the pressing, rolling, and folding operation 10 times. Internal mixers are particularly useful for solution or melt blending. Blending at a temperature of 180° C. to 240° C. in a Brabender Plastograph for 1 to 20 minutes has been found satisfactory. Still another method that may be used for admixing the components involves blending the polymers in a Banbury internal mixer above the flux temperature of all of the components, e.g., 180° C. for 5 minutes. A complete mixture of the polymeric components is indicated by the uniformity of the morphology of the dispersion of SPC and FPC. Continuous mixing may also be used. These processes are well known in the art and include single and twin screw mixing extruders, static mixers for mixing molten polymer streams of low viscosity, impingement mixers, as well as other machines and processes, designed to disperse the first polymer component and the second polymer component in intimate contact.

The polymer blends of the instant invention exhibit a remarkable combination of desirable physical properties. The incorporation of as little as 5% SPC in the FPC composed of propylene/alpha-olefin copolymers increases the melting point of the blend. In addition, the incorporation of SPC in accordance with the instant invention nearly eliminates the stickiness characteristic of the propylene/alpha-olefin copolymer alone.

The mechanism by which the desirable characteristics of the present copolymer blends are obtained is not fully understood. However, it is believed to involve a co-crystallization phenomenon between propylene sequences of similar stereoregularity in the various polymeric components, which results in a merging of the crystallization temperature of the latent components. Applicants do not wish to be bound by this theory. The combined first polymer component and second polymer component have a blend melting point closer together than would be expected on a comparison of the properties of the individual components alone. Surprisingly, some blend compositions have a single crystallization temperature and a single melting temperature, since it would be expected by those skilled in the art that blending a crystalline polymer and a crystallizable polymer would result in a double crystallization temperature as well as a double melting temperature reflecting the two polymeric components. However, the intimate blending of the polymers having the required crystallinity characteristics apparently results in a crystallization phenomenon that modifies the other physical properties of the propylene/alpha-olefin copolymer, thus measurably increasing its commercial utility and range of applications.

One preferable embodiment is the formation of elastic fibers by blending isotactic polypropylene (SPC) with ethylene propylene copolymers (FPC) the latter having 5 wt % to 40 wt. % ethylene. Both the SPC and the FPC have isotactic propylene sequences long enough to crystallize. Substantially, all of the components of the FPC should be within the composition range defined above to ensure increased compatibility with the SPC. Resulting blends of isotactic polypropylene with ethylene propylene copolymers according to the invention have improved properties as compared to isotactic polypropylene blends of ethylene propylene rubbers of the prior art.

While the above discussion has been limited to the description of the invention in relation to having only components one and two (e.g. FPC and SPC), as will be evident to those skilled in the art, the polymer blend compositions of the present invention may comprise other additives. Various additives may be present to enhance a specific property or may be present as a result of processing of the individual components. Additives which may be incorporated include, for example, fire retardants, antioxidants, plasticizers, pigments, vulcanizing or curative agents, vulcanizing or curative accelerators, cure retarders, processing aids, flame retardants, tackifying resins, and the like. These compounds may include fillers and/or reinforcing materials. These include carbon black, clay, talc, calcium carbonate, mica, silica, silicate, combinations thereof, and the like. Other additives which may be employed to enhance properties include antiblocking agents, coloring agent. Lubricants, mold release agents, nucleating agents, reinforcements, and fillers (including granular, fibrous, or powder-like) may also be employed. Nucleating agents and fillers tend to improve rigidity of the article. The list described herein is not intended to be inclusive of all types of additives which may be employed with the present invention. Upon reading this disclosure, those of skill in the art will appreciate other additives may be employed to enhance properties of the composition. As is understood by the skilled in the art, the polymer blend compositions of the present invention may be modified to adjust the characteristics of the blend as desired.

Morphology of the Blend

The morphology of the blend is shown in Transmission Electron Microscopy of the blends. In this procedure samples were exposed to vapors of 1% aqueous $RuO_4$ for 3 days. The $RuO_4$ penetrates the amorphous zones of the continuous, less crystalline phase of the polymer while the more crystalline domains composed largely of the SPC are essentially unaffected. Within the continuous zone the $RuO_4$ stained the microzones of amorphous polymer while the lamellae of crystalline polymer are visible by contrast. The blend was cryomicrotomed at −196° C. to thin sections approximately 0.3 to 3 $\mu$m thick. Several sections were analyzed for each sample until a section was found where the crystalline domains was unstained while the continuous phase was stained to distinguish it from the dispersed phase and to observe the microstructure of the lamellae of polymer.

Figure 2:
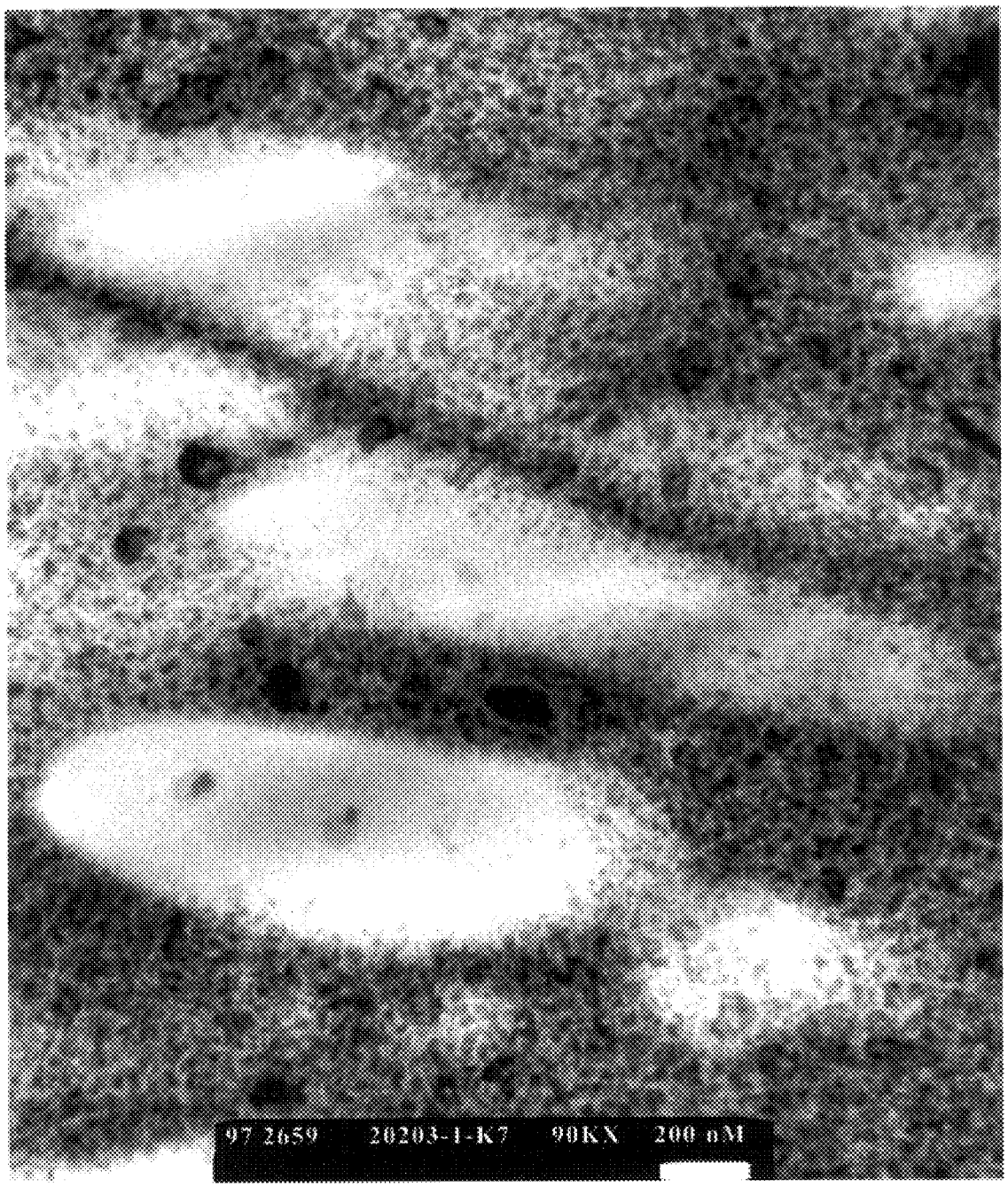
FIG. 2 shows a different blend of the invention, containing 78% of another FPC of a different composition.
Figure 3:
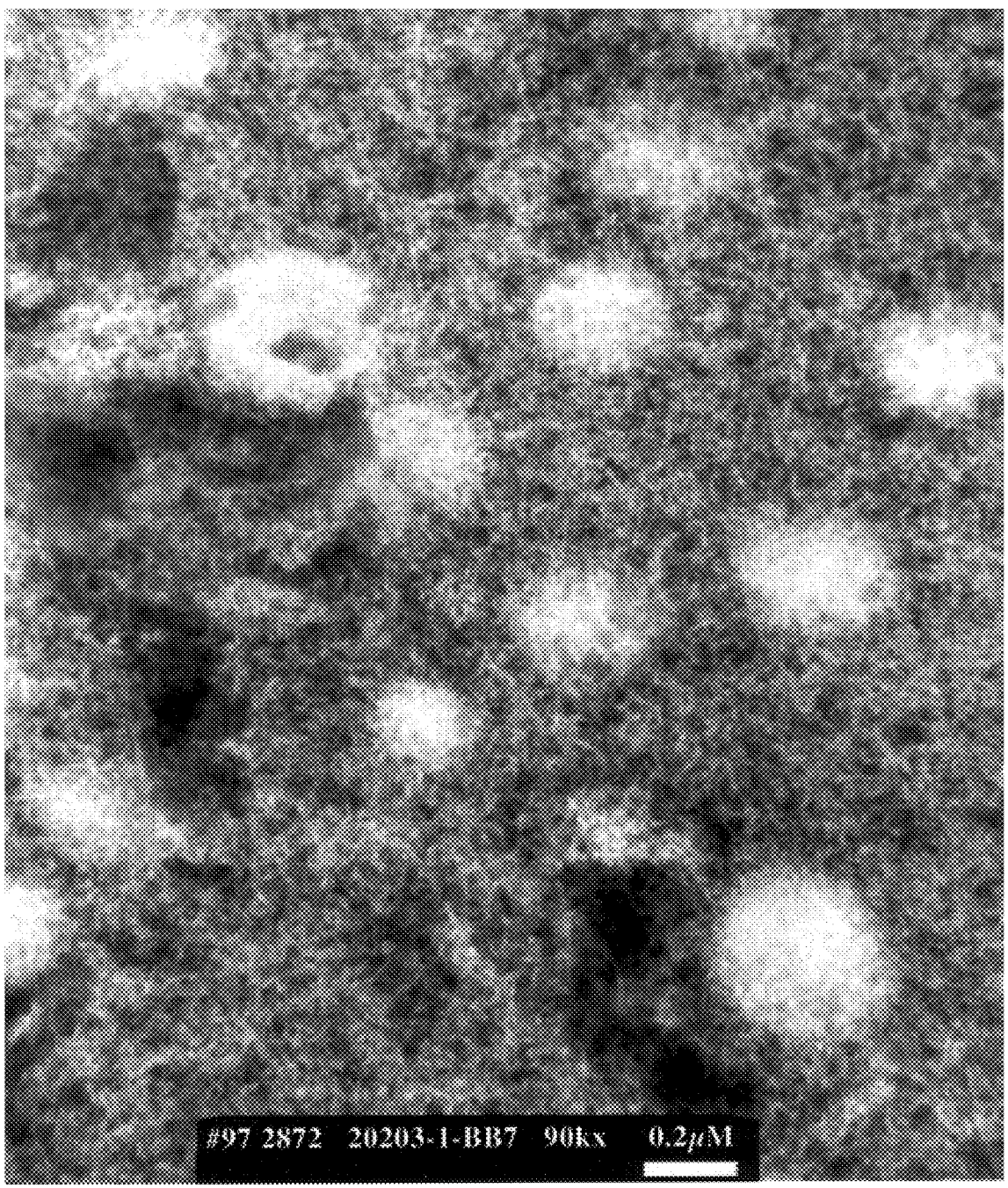
FIG. 3 illustrates the addition of FPC2 to the blend of FIG. 2.

The blends of the current invention with good elastic recovery from tensile deformation had a microstructure with clearly dispersed microdomains of the crystalline phase. This is shown in FIG. 1. The composition of the blend is 78% of FPC and the balance of SPC. The domains are elongated with approximate dimensions of 0.2 $\mu$m×1 $\mu$m. FIG. 2 shows a different blend of the invention, containing 78% of another FPC of a different composition. In FIG. 2 the dispersed phase has dimensions of 0.6 $\mu$m×2.0 $\mu$m. The addition of FPC2 to this blend of FIG. 2 is shown in the micrograph FIG. 3. It shows the reduction in the size of the dispersed phase to elongated particles having 0.2 $\mu$m for each dimension. FPC2 is therefore believed to act as an agent for reducing the size of the dispersion of the crystalline phases in the dispersed continuous phase. This is the morphological effect of adding FPC2 to the blend of a SPC and FPC.

For blends containing at least two polymeric components an additional dispersed phase of greater crystallinity is also present. In this case the sizes of the individual domains of the dispersed phase are very small with the smallest length dimension for the dispersed phase being less than 5 $\mu$m. This phase size of the dispersed phase is maintained during processing even without crosslinking. The components of the blend in both cases are also compatible to the extent that no preformed or in situ formed compatibilizer needs to be added to attain and retain this fine morphology. Furthermore, this invention describes improving the mechanical deformation recoverability of the aforementioned blends by aging the blends and mechanically orienting the fibers formed from these blends. The domains of the dispersed phase are small with an average minimum axis less than 5 $\mu$m. The larger axis of the dispersed phase can be as large as 100 $\mu$m. The dispersed phase consists of a crystalline mixture of SPC with some amount of FPC2 and FPC due to thermodynamic mixing of polymers. The continuous phase consists of the balance of the polymers not included in the dispersed phase. Blends directed to low flexural modulus may have in addition, a heterogeneous phase morphology with continuous phases of lower and greater crystallinity.

Impact copolymer, reactor copolymer, thermoplastic olefins and thermoplastic elastomers have heterophase morphology made by a combination of a SPC and a FPC of the present invention. However, the more crystalline polymer is the continuous phase in these blends and they are excluded from the invention.

Fiber Preparation

The formation of woven and nonwoven articles from polyolefins consisting largely, if not exclusively, of propylene, requires the manufacture of fibers by extrusion followed by weaving or bonding. The extrusion process is typically accompanied by mechanical or aerodynamic drawing of the fibers. Fibers of the present invention are in addition soft and elastic. These desirable properties of the fiber also appear in the properties of the non woven articles. We believe that the softness and the elastic properties of these fibers, which is an important property, impart an additional degree of softness and elasticity. Essentially all fibers are oriented both during the extrusion process as well as during the process of manufacture of the non woven article.

a. Conventional Fine Denier PP Fibers

The three more conventional PP fiber operations, continuous filament, bulked continuous filament, and staple, are contemplated as application for the elastic fibers of the present invention. The polymer melt is extruded through the holes in the die (spinneret) between, 0.3 mm to 0.8 mm (10 mil to 30 mil) in diameter. Low melt viscosity of the polymer blend is important and is achieved through the use of high melt temperature (230° C. to 280° C.) and high melt flow rates (15 g/10 min to 40 g/10 min) are used. A relatively large extruder is usually equipped with a manifold to distribute a high output of molten PP to a bank of eight to twenty spinnerets. Each spinhead is usually equipped with a separate gear pump to regulate output through that spinhead; a filter pack, supported by a "breaker plate;" and the spinneret plate within the head. The number of holes in the spinneret plate determines the number of filaments in a yarn and varies considerably with the different yarn constructions, but it is typically in the range of 50 to 250. The holes are typically grouped into round, annular, or rectangular patterns to assist in good distribution of the quench air flow.

b. Continuous Filament

Continuous filament yarns typically range from 40 denier to 2,000 denier (denier=number of grams/9000 yd). Filaments can range from 1 to 20 dpf, and the range is growing. Spinning speeds are typically 800 m/min to 1500 m/min (2500 ft/min to 5000 ft/min). The filaments are drawn at draw ratios of 3:1 or more (one- or two-stage draw) and wound onto a package. Two-stage drawing allows higher draw ratios to be achieved. Winding speeds are 2,000 m/min to 3,500 n/min (6,600 ft/min to 11,500 ft/min). Spinning speeds in excess of 900 m/min (3000 ft/min) require a NMWD to get the best spinnability with the finer filaments. Resins with a MFR of 5 and a NMWD, with a polydispersity index (PI) under 2.8 are typical. In slower spinning processes, or in heavier denier filaments, a 16-MFR reactor grade product may be more appropriate.

C. Bulked Continuous Filament

Bulked Continuous Filament fabrication processes fall into two basic types, one-step and two step. In the older, two-step process, an undrawn yarn is spun at less than 1,000 m/min (3,300 ft/min), usually 750 m/min, and placed on a package. The yarn is drawn (usually in two stages) and "bulked" on a machine called a texturizer. Winding and drawing speeds are limited by the bulking or texturizing device to 2,500 m/min (8,200 ft/mim) or less. As in the two-step CF process, secondary crystallization requires prompt draw texturizing. The most common process today is the one-step spin/draw/text (SDT) process. This process provides better economics, efficiency and quality than the two-step process. It is similar to the one-step CF process, except that the bulking device is in-line. Bulk or texture changes yarn appearance, separating filaments and adding enough gentle bends and folds to make the yarn appear fatter (bulkier).

d. Staple Fiber

There are two basic staple fiber fabrication processes: traditional and compact spinning. The traditional process involves two steps: 1) producing, applying finish, and winding followed by 2) drawing, a secondary finish application, crimping, and cutting into staple.

Filaments can range from 1.5 dpf to >70 dpf, depending on the application. Staple length can be as short as 7 mm or as long as 200 mm (0.25 in. to 8 in.) to suit the application. For many applications the fibers are crimped. Crimping is accomplished by over-feeding the tow into a steam-heated stuffer box with a pair of nip rolls. The over-feed folds the tow in the box, forming bends or crimps in the filaments. These bends are heat-set by steam injected into the box. The MW, MWD, and isotactic content of the resin all affect crimp stability, amplitude, and ease of crimping.

e. Melt-Blown Fibers

Melt blown fibers can make very fine filaments and produce very lightweight fabrics with excellent uniformity. The result is a soft fabric with excellent "barrier" properties. In the melt blown process molten polymer moves from the extruder to the special melt blowing die. As the molten filaments exit the die, they are contacted by high temperature, high velocity air (called process or primary air). This air rapidly draws and, in combination with the quench air, solidifies the filaments. The entire fiber forming process takes place within 7 mm (0.25 in.) of the die. Die design is the key to producing a quality product efficiently. The fabric is formed by blowing the filaments directly onto a forming wire, 200 mm to 400 mm (8 in. to 15 in.) from the spinnerets. Melt blowing requires very high melt flow rate (MFR) (>200 g/ 10 min), to obtain the finest possible fibers.

f. Spunbonded Fibers

Fiber formation is accomplished extrusion of the molten polymer from either a large spinneret having several thousand holes or with banks of smaller spinnerets containing as few as 40 holes. After exiting the spinneret, the molten fibers are quenched by a cross-flow air quench system, then pulled away from the spinneret and attenuated (drawn) by high pressure air. There are two methods of air attenuation, both of which use the venturi effect. The first draws the filament using an aspirator slot (slot draw), which runs the width of the machine. The second method draws the filaments through a nozzle or aspirator gun. Filaments formed in this manner are collected on a screen ("wire") or porous forming belt to form the fabric. The fabric is then passed through compression rolls and then between heated calender rolls where the raised lands on one roll bond the fabric at points covering 20% to 40% of its area. The typical resin used for spunbonded fabric is a 30 MFR to 40 MFR controlled rheology, NMWD homopolymer resin. The high MFR provides a reasonable throughput while attaining reasonable fabric properties.

It has been surprisingly and inventively found that the these same blends and blends containing these materials in the majority can be easily spun into fibers by extrusion through a spinneret followed by drawing, to the desired denier. Additionally it has been found that the ability to spin fibers of these blend, as measured by the rate of spinning, is unaffected across a wide composition range of blends of isotactic polypropylene and high C3 copolymer. This data is shown in Table 4. It is further surprising that this constancy of the spinning rate is present even though the MFR of the blends is slowly decreased by the addition of the High C3 polymer to the higher MFR isotactic Polypropylene. This is unanticipated since the spinning rate is very sensitive to the MFR of the polymer or polymer blend and low MFR polymer have poorer spinning performance.

Annealing

Another part of the invention is that the mechanical properties referred to above can be obtained by the annealing the polymer fiber. Annealing is often combined with mechanical orientation. It is preferred to employ an annealing step in the process. Annealing may also be done after fabrication of a non-woven material from the fibers. Annealing partially relieves the internal stress in the stretched fiber and restores the elastic recovery properties of the blend in the fiber. Annealing has been shown to lead to significant changes in the internal organization of the crystalline structure and the relative ordering of the amorphous and semicrystalline phases. This leads to recovery of the elastic properties. It has been found that by annealing the fiber at a temperature of at least 40° F., preferably at least 20° F. above room temperature (but slightly below the crystalline melting point of the blend) is adequate for the formation of the elastic properties in the fiber. Thermal annealing of the polymer blend is conducted by maintaining the polymer blends or the articles made from a such a blend at temperature between room temperature to a maximum of 160° C. or more preferably to a maximum of 130° C. for a period between 5 minutes to less than 7 days. A typical annealing period is 3 days at 50° C. or 5 minutes at 100° C. The annealing time and temperature can be adjusted for any particular blend composition comprising a SPC and one or two FPC by experimentation. It is believed that during this annealing process there are intermolecular rearrangement of the polymer chains leading to a material with much greater recovery from tensile deformation than the unannealed material. While the annealing is done in the absence of mechanical orientation, the latter can be a part of the annealing process on the fiber (past the extrusion operation) required to produce an elastic material. Mechanical orientation can be done by the temporary, forced extension of the polymer fiber for a short period of time before it is allowed to relax in the absence of the extensional forces. It is believed that the mechanical orientation of the polymer leads to reorientation of the crystallizable portions of the blend of the first and the second polymer. Oriented polymer fibers are conducted by maintaining the polymer fibers or the articles made from a blend at an extension of 100% to 700% for a period of 0.1 seconds to 24 hours. A typical orientation is an extension of 200% for a momentary period at room temperature.

Annealing and orientation of the blend of the SPC and FPC lead to improvement in the tensile recovery properties of the fiber. This is shown in the data in Tables below where the set recovery values for the blends described in the invention are described for the blends as made, after annealing and after orientation as described in the procedures above. The data show that the elastic recovery properties are enhanced by annealing and/or orientation.

For orientation, a polymeric fiber at an elevated temperature (but below the crystalline melting point of the polymer) is passed from a feed roll of fiber around two rollers driven at different surface speeds and finally to a take-up roller. The driven roller closest to the take-up roll is driven faster than the driven roller closest to the feed roll, such that the fiber is stretched between the driven rollers. The assembly may include a roller intermediate the second roller and take-up roller to cool the fiber. The second roller and the take-up roller may be driven at the same peripheral speeds to maintain the fiber in the stretched condition. If supplementary cooling is not used, the fiber will cool to ambient temperature on the take up roll.

Measurement of Fiber Properties

The stress-strain elongation and elastic recovery properties of the fiber was evaluated for a bundle of fibers. The stress strain evaluation of the samples was conducted on an Instron 4465, made by Instron Corporation of 100 Royall Street, Canton, Mass. The digital data was collected in a file collected by the Series IX Material Testing System available from Instron.

The testing procedure stress-stain elongation for the unannealed fibers is the following:
1. The specimen consisting of a bundle of 72 fibers was mounted on the Instron and the elongated at 20"/min.
2. The maximum elongation of the polymer fiber was recorded as Elongation (unannealed).
3. The tensile strength at this elongation was recorded as Tensile Strength (unannealed).

The testing procedure stress-stain elongation for the annealed fibers is the following:
1. The specimen consisting of a bundle of 72 fibers was mounted on the Instron and the elongated at 20"/min.
2. The maximum elongation of the polymer fiber was recorded as Elongation (annealed).
3. The tensile strength at this elongation was recorded as Tensile Strength (annealed).

The testing procedure for the elastic recovery is the following
1. The specimen consisting of 720 fibers was mounted on the Instron and elongated at 20"/min to an extension of an additional 400% of the original length.
2. The fiber bundle is allowed to retract at the same rate to its original dimension. The elongation and the stress on the fiber bundle are monitored during both the retraction and the elongation cycle at the rate of 20 observations per second.
3. The elongation at which the stress is zero on the retraction cycle is defined as the set of the fiber specimen.

Properties of the Fiber

Elastic Recovery and Elastic Decay

Elastic fibers described herein are those of the above composition and formed by the above process, also described herein which can be elongated at least 300%, more preferably 400% without significant breakage. Soft fibers are those which have a 1% secant modulus less than 25,000 psi in/in, more preferably less than 12,000 psi in/in. It is desirable to have set less than 130% on elongation of the fibers to 400%. It is preferable if the ultimate fiber have all of the properties of high elasticity, low secant modulus and low set simultaneously.

Among the benefits of the above invention is that compositions comprising the SPC and the FPC containing optional amounts of process oil can be made which have excellent elastic recovery from tensile deformation. Table 4 shows the experimental data obtained for fibers of the inventive composition which have the inventive elastic recovery properties. Set are typically below 150% and more typically less than 130%, most typical is less than 125%, preferably below 100%, more preferably below 80%, from a 400% tensile deformation. In general elastic fibers of the present invention should have a low flexural modulus in order to have a soft fiber combined with an extended load range over which small values of set are simultaneously obtained. Some comparative blends in the prior art can be extended to 400% elongation but have poor set from a 400% extension. Generally for all blends the set deteriorates with an increase in the tensile strength at 400% extension. The blends of the current invention have better elastic recovery as indicated by low set, than comparative blends at comparable 400% extension. These properties are available over a wide range of composition and relative amounts of the SPC and the FPC. In the examples shown below we show examples of blends of composition of the SPC and the FPC which have the above favorable combination of properties.

It is possible to generate comparative polymer blends with some aspect of the combined load and set properties of the blends of this invention approached if the FPCs are of extremely high molecular weight and in the limit crosslinked. Such a combination would lead to blends which had very poor processing characteristics since they would tend to melt fracture and would be difficult to form fibers in conventional processing equipment. It is understood that these polymer blends are directed to easy processing materials which can be handled in conventional thermoplastics processing machinery.

Properties of the Blend
Flexural Modulus

Among the benefits of our invention is that compositions comprising the SPC and the FPC containing optional amounts of process oil can be made which have low flexural modulus. These blends have either dispersed or a continuous crystalline phase dispersed in the continuous crystallizable phase. The crystalline phase contains the majority of the SPC and some of the FPC's due to thermodynamic mixing while the continuous phase consists of the balance of the polymer blend. Low flexural modulus is measured as the 1% secant modulus. The values of flexural modulus less than 30 kpsi-inch/inch, preferably less than 25 kpsi in/in more preferably less than 20 kpsi in/in, even more preferably less than 15 kpsi in/in, most preferred less than 12 kpsi in/in.

The flexible blends of the current invention fulfill both of these conditions since they have low flexural modulus and low values of load decay and set. Generally for all blends the flexural modulus deteriorates with increase in the 200% adjusted load. These properties are available over a wide range of composition and relative amounts of the SPC and the FPC. In the examples shown below we show examples of numerous blends of composition of the SPC and the FPC which have the above favorable combination of properties.

It is possible to generate comparative polymer blends with some aspect of the combined 200% load and the low flexural modulus of the blends of this invention if the FPCs are of extremely high molecular weight and in the limit crosslinked. Such a combination would lead to blends which had very poor processing characteristics since they would tend to melt fracture. It is understood that the present inventive polymer blends are directed to easy processing materials which can be handled in conventional thermoplastics processing machinery.

As used herein, Mooney Viscosity was measured as ML (1+4) at 125° C. in Mooney units according to ASTM D1646.

The composition of ethylene propylene copolymers, which are used as comparative examples, was measured as ethylene wt. % according to ASTM D 3900.

The composition of the second polymer component was measured as ethylene wt. % according to the following technique. A thin homogeneous film of the second polymer component, pressed at a temperature of or greater than 150° C. was mounted on a Perkin Elmer PE 1760 infra red spectrophotometer. A full spectrum of the sample from 600 $cm^{-1}$ to 400 $cm^{-1}$ was recorded and the ethylene wt. % of the second polymer component was calculated according to Equation 1 as follows:

$$\text{ethylene wt. \%} = 82.585 - 111.987X + 30.045X^2$$

wherein X is the ratio of the peak height at 1155 $cm^{-1}$ and peak height at either 722 $cm^{-1}$ or 732 $cm^{-1}$, which ever is higher.

Techniques for determining the molecular weight (Mn and Mw) and molecular weight distribution (MWD) are found in U.S. Pat. No. 4,540,753 (which is incorporated by reference herein for purposes of U.S. practice) and references cited therein and in Macromolecules, 1988, volume 21, p 3360 (which is herein incorporated by reference for purposes of U.S. practice) and references cited therein.

The procedure for Differential Scanning Calorimetry is described as follows: 6 to 10 mg of a sheet of the polymer pressed at approximately 200° C. to 230° C. is removed with a punch die. This is annealed at room temperature for 240 hours. At the end of this period, the sample is placed in a Differential Scanning Calorimeter (Perkin Elmer 7 Series Thermal Analysis System) and cooled to −50° C. to −70° C. The sample is heated at 20° C./min to attain a final temperature of 200° C. to 220° C. The thermal output during this heating is recorded as the area under the melting peak of the sample which is typically peaked at 30° C. to 175° C. and occurs between the temperatures of 0° C. and 200° C. is measured in Joules as a measure of the heat of fusion. The melting point is recorded as the temperature of the greatest heat absorption within the range of melting of the sample. Under these conditions, the melting point of the second polymer component and the heat of fusion is lower than the first polymer component as outlined in the description above.

Composition distribution of the second polymer component was measured as described below. About 30 gms of the second polymer component was cut into small cubes ⅛" on the side. This is introduced into a thick walled glass bottle closed with screw cap along with 50 mg of Irganox1076, an antioxidant commercially available from Ciba—Geigy Corporation. Then, 425 ml of hexane (a principal mixture of normal and iso isomers) is added to the contents of the bottle and the sealed bottle is maintained at 23° C. for 24 hours. At the end of this period, the solution is decanted and the residue is treated with additional hexane for an additional 24 hours. At the end of this period, the two hexane solutions are combined and evaporated to yield a residue of the polymer soluble at 23° C. To the residue is added sufficient hexane to bring the volume to 425 ml and the bottle is maintained at 31° C. for 24 hours in a covered circulating water bath. The soluble polymer is decanted and the additional amount of hexane is added for another 24 hours at 31° C. prior to decanting. In this manner, fractions of the second polymer component soluble at 40° C., 48° C., 55° C. and 62° C. are obtained at temperature increases of approximately 8° C. between stages. Further, increases in temperature to 95° C. can be accommodated, if heptane, instead of hexane, is used as the solvent for all temperatures above 60° C. The soluble polymers are dried, weighed and analyzed for composition, as wt. % ethylene content, by the IR technique described above. Soluble fractions obtained in the adjacent temperature increases are the adjacent fractions in the specification above.

Comparative data was obtained with EPR which is Vistalon® 457, sold by the Exxon Chemical Company, Houston Tex.

Blends were made by mixing a total of 72 g of all components, including the first polymer component, the second polymer component, the optional amounts of process oil and other ingredients in a Brabender intensive mixture for 3 minutes at a temperature controlled to be within 185° C. and 220° C. High shear roller blades were used for the mixing and approximately 0.4 g of lrganox-1076, an antioxidant available from the Novartis Corporation, was added to the blend. Samples were aged by allowing them to stand at room temperature prior to testing. Samples were aged for 5, 10, 15, 20 and 25 days prior to testing on the Instron. Significant difference in the tensile strength and tension set were observed between samples aged 1 days versus those aged for 5 or more days. There was no experimental difference between samples aged 5 days or longer.

Samples were oriented by momentarily extending them to 200% extension at room temperature. These oriented samples were retested under tensile testing conditions outlined above.

Flexural modulus was determined for samples of the blend by ASTM procedure D790 at room temperature.

The invention, while not meant to be limited thereby, is further illustrated by the following specific examples:

EXAMPLES

Example 1

Ethylene/propylene copolymerization to form the first polymer component.

Continuous Polymerization of the FPC was conducted in a 9 liter Continuous Flow Stirred Tank Reactor using hexane as the solvent. The liquid full reactor had a residence time of 9 minutes and the pressure was maintained at 700 kpa. A mixed feed of Hexane, ethylene and propylene was pre-chilled to approximately −30° C. to remove the heat of polymerization, before entering the reactor. Solution of catalyst/activator in Toluene and the scavenger in hexane were separately and continuously admitted into the reactor to initiate the polymerization. The reactor temperature was maintained between 35 and 50 C, depending on the target molecular weight. The feed temperature was varied. depending on the polymerization rate to maintain a constant reactor temperature. The polymerization rate was varied from 0.5 Kg/hr to 4 Kg/hr.

Hexane at 30 Kg/hr was mixed with ethylene at 717 g/hr and propylene at 5.14 Kg/hr and fed to the reactor. The polymerization catalyst, dimethyl silyl bridged bis-indenyl Hafnium dimethyl activated 1:1 molar ratio with N',N'-Dimethyl anilinium-tetrakis (pentafluorophenyl)borate was introduced at the rate of at 0.0135 g/hr. A dilute solution of triisobutyl aluminum was introduced into the reactor as a scavenger of catalyst terminators: a rate of approximately 111 mole of scavenger per mole of catalyst was adequate for this polymerization. After five residence times of steady polymerization, a representative sample of the polymer produced in this polymerization was collected. The solution of the polymer was withdrawn from the top, and then steam distilled to isolate the polymer. The polymerization rate was measured at 3.7 Kg/hr. The polymer produced in this polymerization had an ethylene content of 14%, ML (1+4) 125C of 13.1 and had isotactic propylene sequences.

Variations in the composition of the polymer were obtained principally by changing the ratio of ethylene to propylene. Molecular weight of the polymer was varied by either changing the reactor temperature or by changing the ratio of total monomer feed rate to the polymerization rate. Dienes for terpolymerization were added to the mixed feed stream entering the reactor by preparing the diene in a hexane solution and metering it in the required volumetric amount.

Example 2

Comparative ethylene/propylene polymerization where the propylene residues are atactic.

Polymerizations were conducted in a 1 liter thermostatted continuous feed stirred tank reactor using hexane as the solvent. The polymerization reactor was full of liquid. The residence time in the reactor was typically 7–9 minutes and the pressure was maintained at 400kpa. Hexane, ethene and propene were metered into a single stream and cooled before introduction into the bottom of the reactor. Solutions of all reactants and polymerization catalysts were introduced continuously into the reactor to initiate the exothermic polymerization. Temperature of the reactor was maintained at 45° C. by changing the temperature of the hexane feed and by using cooling water in the external reactor jacket. For a typical polymerization, the temperature of feed was −10° C. Ethene was introduced at the rate of 45 gms/min and propene was introduced at the rate of 310 gms/min. The polymerization catalyst, dimethyl silyl bridged (tetramethylcyclopentadienyl) cyclododecylamido titanium dimethyl activated 1:1 molar ratio with N',N'-Dimethyl anilinium-tetrakis (pentafluorophenyl)borate was introduced at the rate of 0.002780 gms/hr. A dilute solution of triisobutyl aluminum was introduced into the reactor as a scavenger of catalyst terminators: a rate of approximately 36.8 mole per mole of catalyst was adequate for this polymerization. After five residence times of steady polymerization, a representative sample of the polymer produced in this polymerization was collected. The solution of the polymer was withdrawn from the top, and then steam distilled to isolate the polymer. The rate of formation of the polymer was 258 gms/hr. The polymer produced in this polymerization had an ethylene content of 14.1 wt. %, ML@125° C.(1+4) of 95.4.

Variations in the composition of the polymer were obtained principally by changing the ratio of ethene to propene. Molecular weight of the polymer could be increased by a greater amount of ethene and propene compared to the amount of the polymerization catalyst. These polymers are described as aePP in the Tables below.

Example 3

Analysis and solubility of several first polymer components

In the manner described in Example 1 above, several first polymer components of the above specification were synthesized. These are described in the table below. Table 1 describes the results of the GPC, composition, ML and DSC analysis for the polymers.

TABLE 1

Analysis Of The First Polymer Component And The Comparative Polymers

| FPC | (Mn) by GPC | (Mw) by GPC | Ethylene Wt % by IR | Heat of fusion J/g | Melting Point by DSC (° C.) | ML (1 + 4) @ 1 25° C. |
|---|---|---|---|---|---|---|
| FPC-1 | 102000 | 248900 | 7.3 | 71.9 | 84.7 | 14 |
| FPC-2 | | | 9.4 | 30.2 | 65.2 | 27.8 |
| FPC-3 | 124700 | 265900 | 11.6 | 17.1 | 43.0 | 23.9 |
| FPC-4 | | | 12.8 | 16.4 | 42.5 | |
| FPC-5 | | | 14.7 | 13.2 | 47.8 | 38.4 |
| FPC-6 | 121900 | 318900 | 16.4 | 7.8 | 40.3 | 33.1 |
| FPC-7 | | | 17.8 | 5.3 | 39.5 | |
| Comparative Polymers | | | | | | |
| EPR | | | 47.8 | not detected | not detected | 40 |
| aePP | | | 11.7 | not detected | not detected | 23 |

Table 2 describes the solubility of the first polymer component.

TABLE 2

| FPC | Wt. % Soluble at 23° C. | Wt. % Soluble at 31° C. | Wt. % Soluble at 40° C. | Wt. % Soluble at 48° C. |
|---|---|---|---|---|
| FPC-1 | 1.0 | 2.9 | 28.3 | 68.5 |
| FPC-3 | 6.5 | 95.7 | | |
| FPC-6 | 51.6 | 52.3 | 2.6 | |
| FPC-5 | 36.5 | 64.2 | | |
| Comparative Polymers | | | | |
| EPR | 101.7 | | | |
| aePP | 100.5 | | | |

Table 2: Solubility of fractions of the first polymer component. Sum of the fractions add up to slightly more than 100 due to imperfect drying of the polymer fractions.

Table 3 describes the composition of the fractions of the first polymer component obtained in Table 2. Only fractions which have more than 4% of the total mass of the polymer have been analyzed for composition.

TABLE 3

Composition: Wt % ethylene in fraction

| FPC | Soluble at 23° C. | Soluble at 31° C. | Soluble at 40° C. | Soluble at 48° C. | Soluble at 56° C. |
|---|---|---|---|---|---|
| FPC-1 | | | 8.0 | | 7.6 |
| FPC-3 | 12.0 | 11.2 | | | |
| FPC-6 | 16.8 | 16.5 | | | |
| FPC-5 | 14.9 | 14.6 | | | |
| Comparative | | | | | |
| EPR | 46.8 | | | | |
| Atactic ePP | 11.8 | | | | |

Table 3: Composition of fractions of the first polymer component obtained in Table 2. The experimental inaccuracy in determination of the ethylene content is believed to 0.4 wt% absolute.

Example 4

Fiber Spinning

Conditions: Blends of FPC and SPC were produced in a 20 mm twin screw extruder to assure good homogeneity. These samples were spun into fibers using a fiber spinning line. The fiber spinning line consists of a 2" extruder, a gear pump, a 72-hole spinneret, fiber quenching cabinet, and wind-up station. The spinneret capillary hole size is 0.6 mm in diameter. The output rate per hole is 0.8 gram/hole/min. with a melt temperature of 450° F. The constant output rate, fiber was spun at various speeds ranging from 1000 m/min. to 3000 m/min. Fibers were collected in a spool and physical properties measured following standard tests. In this experiment the SPC was Achieve® 3854, a 25 MFR isotactic polypropylene (iPP) available from the Exxon Chemical Co., Houston, Tex. and the FPC was a copolymer of ethylene and propylene produced as shown in example 1 with a composition of 13.5% ethylene and a ML of 12.

testing Results:

TABLE 4

Data for 72 fiber bundle

| Example 4- | SPC wt % | FPC wt % | MFR of Blend | Winder Speed (meter/min) | Denier | Tensile Strength (gms) | Elongation | Tenacity (g/denier) |
|---|---|---|---|---|---|---|---|---|
| 001 | 100 | 0 | 25.10 | 1000 | 402 | 855 | 266 | 2.13 |
| 002 | 100 | 0 | 25.10 | 1500 | 263 | 737 | 213 | 2.80 |
| 003 | 100 | 0 | 25.10 | 2000 | 200 | 578 | 174 | 2.89 |
| 004 | 100 | 0 | 25.10 | 2500 | 158 | 5041 | 140 | 3.19 |
| 005 | 95 | 5 | 24.36 | 1000 | 392.5 | 966 | 221.5 | 2.46 |
| 006 | 95 | 5 | 24.36 | 1500 | 279.5 | 767 | 157 | 2.75 |
| 007 | 95 | 5 | 24.36 | 2000 | 208 | 734 | 131.6 | 3.53 |
| 008 | 95 | 5 | 24.36 | 2500 | 166.5 | 635 | 117 | 3.81 |
| 009 | 90 | 10 | 20.74 | 1000 | 411 | 937 | 208.6 | 2.28 |
| 010 | 90 | 10 | 20.74 | 1500 | 220 | 698 | 149 | 3.17 |
| 011 | 90 | 10 | 20.74 | 2000 | 208 | 774 | 127 | 3.72 |
| 012 | 90 | 10 | 20.74 | 2500 | 164.5 | 698 | 115 | 4.24 |
| 013 | 80 | 20 | 18.97 | 1000 | 421 | 1002 | 211 | 2.38 |
| 014 | 80 | 20 | 18.97 | 1500 | n.a. | | | |
| 015 | 80 | 20 | 18.97 | 2000 | 204 | 741.5 | 119 | 3.64 |
| 016 | 80 | 20 | 18.97 | 2500 | 166.5 | 672.5 | 104 | 4.04 |
| 017 | 50 | 50 | 12.47 | 1000 | 413 | 1166 | 138.5 | 2.82 |
| 018 | 50 | 50 | 12.47 | 1500 | 274 | 949 | 99 | 3.46 |
| 019 | 50 | 50 | 12.47 | 2000 | 210.5 | 749 | 87 | 3.56 |
| 020 | 50 | 50 | 12.47 | 2500 | 169 | 672 | 82 | 3.97 |
| 021 | 35 | 65 | 9.93 | 1000 | 418 | 1085.5 | 129 | 2.60 |

TABLE 4-continued

|  | | | | Data for 72 fiber bundle | | | | |
| --- | --- | --- | --- | --- | --- | --- | --- | --- |
| Example 4- | SPC wt % | FPC wt % | MFR of Blend | Winder Speed (meter/min) | Denier | Tensile Strength (gms) | Elongation | Tenacity (g/denier) |
| 022 | 35 | 65 | 9.93 | 1500 | 281.5 | 1014 | 95.5 | 3.60 |
| 023 | 35 | 65 | 9.93 | 2000 | n.a. | | | |
| 024 | 35 | 65 | 9.93 | 2500 | 209 | 833.5 | 78.5 | 3.99 |

Table 4: Physical property testing results for the fibers made in Example 4.

In these examples above the fiber spinning was successful but the resultant fiber was inelastic as shown by elongation less than 400%.

Example 5

Fiber Spinning

Conditions: Blends of FPC, and FPC2 as indicated in the table below and SPC were produced in a 20 mm twin screw extruder to assure good homogencity. These were spun into fibers as shown in Example 4. In this experiment the SPC was Achieve 3854, a 25 MFR iPP available from the Exxon Chemical Co., Houston, Tex. and the FPC and FPC2, made using procedures similar to that in Example 1, was a copolymer of ethylene and propylene. Their composition is shown in Table 6.

TABLE 5

| Example | | 5-1 | 5-2 | 5-3 | 5-4 | 5-5 | 5-5 |
| --- | --- | --- | --- | --- | --- | --- | --- |
| Composition | | | | | | | |
| SPC | | 100 | 20 | 80 | 60 | 40 | 20 |
| FPC (a) | | | 80 | | | | |
| FPC (b) | | | | 16 | 32 | 48 | 64 |
| FPC2 | | | | 4 | 8 | 12 | 16 |
| Winding Speed | | | | | | | |
| 2000 m/m | Denier per fiber | 2.82 | 2.89 | 2.89 | 2.61 | 2.48 | 2.85 |
| 2500 m/m | Denier per fiber | 2.26 | 1.85 | 2.26 | 2.25 | 2.22 | 2.24 |
| 2000 m/m | Tenacity (gm/denier) | 3.72 | 3.52 | 3.41 | 2.78 | 3.59 | 3.74 |
| 2500 m/m | Tenacity (gm/denier) | 3.75 | 4.33 | 3.85 | 3.89 | 3.38 | 2.99 |
| 2000 m/m | Elongation (%) | 149.6 | 60.4 | 104.2 | 97.8 | 85.6 | 87.5 |
| 2500 m/m | Elongation (%) | 129.4 | 60.6 | 99.3 | 90.3 | 78.7 | 59.2 |

Table 5: Physical property testing results for the fibers made in Example 5.

TABLE 6

| FPC polymers | C2 wt % | ML(1 + 4) @ 125° |
| --- | --- | --- |
| FPC2 | 5.85 | 21.9 |
| FPC(a) | 12.3 | 12.3 |
| FPC(b) | 14.5 | 11.4 |

Table 6: Compositional parameters for FPC and FPC2 polymer used in Example 5.

Example 6

Annealing

Fibers made in Example 5 at a winder speed of 2000 m/m were annealed under conditions shown in Tables 7a–d. 6 ft of the polymer fiber was loosely wound around a dowel and immersed in warm water maintained at the temperature specified for the time indicated in the Table 7 below. The length contraction is the length after annealing versus the length prior to annealing. At the end of the experiment the sample of the fiber was removed, allowed to cool at room temperature and tested the next day for elongation, and elastic recovery from a deformation of 400% as described above.

TABLE 7A

Annealing results at 60° C. and 75° C. for samples 5-1 and 5-2

| | | Sample 5-1 | | | Sample 5-2 | | |
| --- | --- | --- | --- | --- | --- | --- | --- |
| Annealing Time (sec) | Temp (° C.) | Length contraction | Elongation (%) | Elastic Recovery (%) | Length contraction | Elongation (%) | Elastic Recovery (%) |
| 1 | 60 | .99 | 112 | Broke | .83 | 320 | 245 |
| 2 | 60 | .99 | 78 | Broke | .80 | 411 | 212 |
| 10 | 60 | .93 | 143 | Broke | .78 | 387 | 320 |
| 30 | 60 | .99 | 134 | Broke | .74 | 320 | 287 |
| 60 | 60 | .99 | 217 | Broke | .73 | 412 | 231 |
| 100 | 60 | .99 | 156 | Broke | .72 | 418 | 245 |
| 300 | 60 | .99 | 154 | Broke | .73 | 432 | 197 |
| 600 | 60 | .99 | 134 | Broke | .74 | 429 | 267 |
| 1200 | 60 | .99 | 165 | Broke | .72 | 412 | 254 |
| 3600 | 60 | .99 | 200 | Broke | .75 | 419 | 239 |

TABLE 7A-continued

Annealing results at 60° C. and 75° C. for samples 5-1 and 5-2

| | | Sample 5-1 | | | Sample 5-2 | | |
|---|---|---|---|---|---|---|---|
| Annealing Time (sec) | Temp (° C.) | Length contraction | Elongation (%) | Elastic Recovery (%) | Length contraction | Elongation (%) | Elastic Recovery (%) |
| 1 | 75 | .98 | 83 | Broke | .83 | 467 | 134 |
| 2 | 75 | .99 | 34 | Broke | .80 | 567 | 134 |
| 10 | 75 | .99 | 112 | Broke | .77 | 583 | 113 |
| 30 | 75 | .98 | 168 | Broke | .70 | 583 | 112 |
| 60 | 75 | .97 | 123 | Broke | .67 | 597 | 109 |
| 100 | 75 | .98 | 143 | Broke | .54 | >600 | 100 |
| 300 | 75 | .97 | 176 | Broke | .52 | >600 | 102 |
| 600 | 75 | .99 | 112 | Broke | .50 | >600 | 95 |
| 1200 | 75 | .98 | 56 | Broke | .50 | >600 | 97 |
| 3600 | 75 | .97 | 114 | Broke | .50 | >600 | 96 |

TABLE 7B

Annealing results at 90° C. and 105° C. for samples 5-1 and 5-2

| | | Sample 5-1 | | | Sample 5-2 | | |
|---|---|---|---|---|---|---|---|
| Annealing Time (sec) | Temp (° C.) | Length contraction | Elongation (%) | Elastic Recovery (%) | Length contraction | Elongation (%) | Elastic Recovery (%) |
| 1 | 90 | .96 | 68 | Broke | .81 | >600 | 112 |
| 2 | 90 | .97 | 56 | Broke | .79 | >600 | 100 |
| 10 | 90 | .91 | 114 | Broke | .73 | >600 | 89 |
| 30 | 90 | .94 | 113 | Broke | .69 | >600 | 87 |
| 60 | 90 | .94 | 123 | Broke | .64 | >600 | 90 |
| 100 | 90 | .92 | 136 | Broke | .50 | >600 | 100 |
| 300 | 90 | .93 | 76 | Broke | .50 | >600 | 84 |
| 600 | 90 | .94 | 11 | Broke | .49 | >600 | 78 |
| 1200 | 90 | .95 | 23 | Broke | .49 | >600 | 78 |
| 3600 | 90 | .97 | 39 | Broke | .49 | >600 | 79 |
| 1 | 105 | .96 | 45 | Broke | .81 | >600 | 111 |
| 2 | 105 | .95 | 67 | Broke | .67 | >600 | 98 |
| 10 | 105 | .91 | 112 | Broke | .54 | >600 | 79 |
| 30 | 105 | .95 | 100 | Broke | .34 | >600 | 66 |
| 60 | 105 | .92 | 56 | Broke | .45 | >600 | 49 |
| 100 | 105 | .90 | 67 | Broke | .31 | >600 | 47 |
| 300 | 105 | .89 | 84 | Broke | .29 | >600 | 40 |
| 600 | 105 | .91 | 39 | Broke | .28 | >600 | 46 |
| 1200 | 105 | .92 | 59 | Broke | .27 | >600 | 45 |
| 3600 | 105 | .91 | 69 | Broke | .26 | >600 | 54 |

TABLE 7C

Annealing results at 60° C. and 75° C. for samples 5-4 and 5-5

| | | Sample 5-4 | | | Sample 5-5 | | |
|---|---|---|---|---|---|---|---|
| Annealing Time (sec) | Temp (° C.) | Length contraction | Elongation (%) | Elastic Recovery (%) | Length contraction | Elongation (%) | Elastic Recovery (%) |
| 1 | 60 | .87 | 245 | Broke | .56 | 320 | 212 |
| 2 | 60 | .78 | 312 | Broke | .50 | 411 | 345 |
| 10 | 60 | .82 | 345 | Broke | .49 | 387 | 145 |
| 30 | 60 | .80 | 387 | Broke | .48 | 320 | 278 |
| 60 | 60 | .19 | 376 | Broke | .47 | 412 | 134 |
| 100 | 60 | .78 | 383 | Broke | .48 | 418 | 156 |
| 300 | 60 | .77 | 278 | Broke | .45 | 432 | 135 |
| 600 | 60 | .76 | 376 | Broke | .46 | 429 | 156 |

TABLE 7C-continued

Annealing results at 60° C. and 75° C. for samples 5-4 and 5-5

| Annealing Time (sec) | Temp (° C.) | Sample 5-4 | | | Sample 5-5 | | |
|---|---|---|---|---|---|---|---|
| | | Length contraction | Elongation (%) | Elastic Recovery (%) | Length contraction | Elongation (%) | Elastic Recovery (%) |
| 1200 | 60 | .72 | 356 | Broke | .40 | 412 | 173 |
| 3600 | 60 | .70 | 348 | Broke | .40 | 419 | 165 |
| 1 | 75 | .98 | 83 | Broke | .62 | 621 | 287 |
| 2 | 75 | .99 | 34 | Broke | .48 | 645 | 285 |
| 10 | 75 | .99 | 112 | Broke | .46 | >600 | 178 |
| 30 | 75 | .98 | 168 | Broke | .41 | >600 | 162 |
| 60 | 75 | .97 | 123 | Broke | .39 | >600 | 134 |
| 100 | 75 | .98 | 143 | Broke | .33 | >600 | 132 |
| 300 | 75 | .97 | 176 | Broke | .32 | 626 | 123 |
| 600 | 75 | .99 | 112 | Broke | .30 | 598 | 101 |
| 1200 | 75 | .98 | 56 | Broke | .31 | 629 | 100 |
| 3600 | 75 | .97 | 114 | Broke | .29 | >650 | 96 |

TABLE 7D

Annealing results at 90° C. and 105° C. for samples 5-4 and 5-5

| Annealing Time (sec) | Temp (° C.) | Sample 5-4 | | | Sample 5-5 | | |
|---|---|---|---|---|---|---|---|
| | | Length contraction | Elongation (%) | Elastic Recovery (%) | Length contraction | Elongation (%) | Elastic Recovery (%) |
| 1 | 90 | .87 | 652 | 235 | .67 | 734 | 212 |
| 2 | 90 | .70 | 812 | 112 | .52 | >650 | 91 |
| 10 | 90 | .56 | >650 | 98 | .40 | >650 | 75 |
| 30 | 90 | .41 | >650 | 101 | .28 | >650 | 64 |
| 60 | 90 | .32 | >650 | 85 | .25 | >650 | 69 |
| 100 | 90 | .29 | >650 | 78 | .23 | >650 | 56 |
| 300 | 90 | .28 | >650 | 76 | .22 | >650 | 65 |
| 600 | 90 | .28 | >650 | 74 | .22 | >650 | 59 |
| 1200 | 90 | .27 | >650 | 70 | .22 | >650 | 45 |
| 3600 | 90 | .26 | >650 | 72 | .23 | >650 | 49 |
| 1 | 105 | .80 | >650 | 137 | .54 | >650 | 123 |
| 2 | 105 | .64 | >650 | 89 | .49 | >650 | 89 |
| 10 | 105 | .51 | >650 | 78 | .34 | >650 | 76 |
| 30 | 105 | .36 | >650 | 70 | .26 | >650 | 61 |
| 60 | 105 | .32 | >650 | 67 | .23 | >650 | 56 |
| 100 | 105 | .25 | >650 | 67 | .22 | >650 | 51 |
| 300 | 105 | .24 | >650 | 59 | .22* | >650 | 49 |
| 600 | 105 | .25 | >650 | 68 | .22* | >650 | 48 |
| 1200 | 105 | .22 | >650 | 57 | .22* | >650 | 47 |
| 3600 | 105 | .24 | >650 | 59 | .21* | >650 | 49 |

Samples with * are slightly sticky.

Example 7

Blends were made in all composition of Table 8 according to the procedure described above.

TABLE 8

Flexural Modulus for Binary blends of one FPC and one SPC as molded

| Sample | Wt % FPC | ML of FCP | C2 wt % of FPC | Flexural modulus (kpsi.in/in) |
|---|---|---|---|---|
| H6 | 66.7 | 25.3 | 12.0 | 18.1 |
| H7 | 77.8 | 25.3 | 12.0 | 10.1 |
| H8 | 88.9 | 25.3 | 12.0 | 5.5 |
| H9 | 100 | 25.3 | 12.0 | 3.8 |
| K5 | 55.6 | 28.9 | 14.8 | 23.1 |
| K6 | 66.7 | 28.9 | 14.8 | 7.7 |
| K7 | 77.8 | 28.9 | 14.8 | 3.9 |
| K8 | 88.9 | 28.9 | 14.8 | 1.8 |
| K9 | 100 | 28.9 | 14.8 | 1.3 |
| M6 | 66.7 | 25.6 | 17 | 4.2 |
| M7 | 77.8 | 25.6 | 17 | 1.8 |
| M8 | 88.9 | 25.6 | 17 | 1.0 |
| M9 | 100 | 25.6 | 17 | 0.8 |

TABLE 8-continued

Flexural Modulus for Binary blends of one FPC and one SPC as molded

| Sample | Wt % FPC | ML of FCP | C2 wt % of FPC | Flexural modulus (kpsi.in/in) |
|---|---|---|---|---|
| P8 | 88.9 | 16.4 | 10.8 | 7.4 |
| P9 | 100 | 16.4 | 10.8 | 5.7 |

In this example blends of a Second Polymeric Component (SPC), Escorene 4292, a homoisotactic polypropylene available from Exxon Chemical Co. Houston Tex. and one First Polymeric component (identified as FPC in Table 8) were made using the procedure as described above. The blends were made in a different composition range as shown by the table above. All of the compositions have the properties of this invention. Properties of the blend were measured as molded.

Example 8

Blends were made in all composition of Table 9 according to the procedure described above.

TABLE 9

Flexural Modulus for Ternary Blends of one SPC and two FPC as molded

| Sample | Wt % FPC | ML of FPC | C2 Wt % of FPC | Wt % FPC2 | Flexural modulus (kpsi · in/in) |
|---|---|---|---|---|---|
| AA4 | 44.4 | 31.2 | 13.4 | 27.8 | 16.6 |
| AA5 | 55.6 | 31.2 | 13.4 | 22.2 | 11.3 |
| AA6 | 66.7 | 31.2 | 13.4 | 16.7 | 7.9 |
| AA7 | 77.8 | 31.2 | 13.4 | 11.1 | 4.7 |
| AA8 | 88.9 | 31.2 | 13.4 | 5.56 | 3.4 |
| BB4 | 44.4 | 38.4 | 14.7 | 27.8 | 17.4 |
| BB5 | 55.6 | 38.4 | 14.7 | 22.2 | 13.8 |
| BB6 | 66.7 | 38.4 | 14.7 | 16.7 | 4.8 |
| BB7 | 77.8 | 38.4 | 14.7 | 11.1 | 2.9 |
| BB8 | 88.9 | 38.4 | 14.7 | 5.56 | 1.9 |
| CC5 | 55.6 | 24.9 | 12.1 | 22.2 | 17.4 |
| CC6 | 66.7 | 24.9 | 12.1 | 16.7 | 12.1 |
| CC7 | 77.8 | 24.9 | 12.1 | 11.1 | 8.7 |
| CC8 | 88.9 | 24.9 | 12.1 | 5.56 | 5.8 |
| CC9 | 100 | 24.9 | 12.1 | 0 | 4.6 |
| FF5 | 55.6 | 38.4 | 14.7 | 13.32 | 22.0 |
| FF6 | 66.7 | 38.4 | 14.7 | 10.02 | 8.4 |
| FF7 | 77.8 | 38.4 | 14.7 | 6.66 | 4.1 |
| FF8 | 88.9 | 38.4 | 14.7 | 3.33 | 2.5 |
| FF9 | 100 | 38.4 | 14.7 | 0 | 2.0 |
| DD4 | 44.4 | 23.4 | 16.8 | 27.8 | 13.2 |
| DD5 | 55.6 | 23.4 | 16.8 | 22.2 | 6.2 |
| DD6 | 66.7 | 23.4 | 16.8 | 16.7 | 2.5 |
| DD7 | 77.8 | 23.4 | 16.8 | 11.1 | 1.4 |
| DD8 | 88.9 | 23.4 | 16.1 | 5.56 | 1.1 |
| HH5 | 55.6 | 23.4 | 16.8 | 13.32 | 13.1 |
| HH6 | 66.7 | 23.4 | 16.8 | 10.02 | 4.0 |
| HH7 | 77.8 | 23.4 | 16.8 | 6.66 | 1.9 |
| HH8 | 88.9 | 23.4 | 16.8 | 3.33 | 1.1 |

In this example blends of a Second Polymeric Component (SPC), Escorene 4292, a homoisotactic polypropylene available from Exxon Chemical Co., Houston Tex. and two First Polymeric component (identified as FPC and FPC2 in Table 5) were made using the procedure as described above. The FPC2 has a ML(1+4)@125° C. of 14 and an ethylene content of 7.3 wt %. The composition and the ML of the FPC is indicated in the Table 8 and 9 for the various SPC used. The blends were made in a different composition range as shown by the table above. All of the compositions have the properties of this invention. Properties of the blend were measured as molded.

Although the present invention has been described in considerable detail with reference to certain preferred embodiments thereof, other embodiments are possible. For example while fibers containing a FPC and a SPC were exemplified, other polymers may be included. Therefore the spirit and scope of the appended claims should not be limited to the description of the preferred embodiments contained herein.

We claim:

1. A soft, set-resistant, annealed fiber comprising a blend of polyolefins, said blend including:
   a) a first polymer component (FPC) present in said fiber in the range of from 75–98 weight percent, based on the total weight of said polyolefins;
       wherein said FPC has a melting point as determined by differential scanning calorimetry (DSC) in the range of from 25–70° C.;
       wherein said FPC has a heat of fusion less than 25 J/g;
       wherein said FPC is a propylene-ethylene polymer having said propylene present in said FPC at 80 weight percent or greater, having said ethylene present at 20 weight percent or less; and
   b) a second polymer component (SPC) present in said fiber in the range of from 2–25 weight percent based on the total polymer in said fiber, the remainder of said fiber being made up of said FPC;
       wherein said SPC is a stereoregular isotactic polypropylene,
       wherein said SPC has a melting point as determined by DSC greater than 130° C., and a heat of fusion greater than 120 J/g;
       wherein said fiber exhibits a resistance to set equal to or less than 80% from a 400% tensile deformation, and wherein said blend of polyolefins in said fiber has a flexural modulus less than or equal to 12,000 psi in/in.

2. The soft, set-resistant annealed fiber of claim 1 wherein said FPC additionally includes a second first polymer component (FPC2);
   wherein said FPC2 has a melting point less than 100° C.;
   wherein said FPC2 has a heat of fusion less than 65 J/g;
   wherein said FPC2 is a propylene-ethylene copolymer;
   wherein said propylene is present at greater than 75 weight percent, based on the total weight of the copolymer; and
   wherein said FPC2 is present in said FPC up to a ratio of 50:50 with said FPC.

3. The soft, set-resistant annealed fiber of claim 2, wherein said fiber additionally includes a process oil present in said fiber in the range of from 1–50 parts per hundred parts of said blend of said polyolefins.

4. An annealed fiber having excellent resistance to set and low flexural modulus, said fiber optionally including a blend of polymers, said optional blend of polymers in said fiber being substantially non crosslinked, comprising:
   a) a first polymer component (FPC), said FPC has:
       i) a composition distribution such that at least 75 weight percent of the polymer is isolated in two adjacent soluble fractions, each of these fractions has a composition difference of no greater than 20% (relative) of the average weight percent ethylene content of the whole first polymer component;
       ii) a melting point, as determined by DSC less than 105° C.;
       iii) a heat of fusion less than 45 J/g;
       iv) propylene and an α-olefin present, wherein said α-olefin is present in said FPC from 5–40 weight %, wherein said α-olefin is selected from the group consisting of ethylene and $C_4$–$C_{12}$ alpha-olefins, propylene making up the balance of said FPC;
wherein said FPC is present in said blend from 5–100% by weight;
b) a second polymer component (SPC), said SPC being a crystalline polymer having:
i) a melting point above 110° C.;
ii) a heat of fusion above 60 J/g;
iii) Propylene present at least 90 weight %, and an (α-olefin present at less than 9 weight %, the total of said propylene and said α-olefin being 100 weight %;
said SPC being present in said blend from 0–95 weight percent, and wherein said fiber exhibits a resistance to set equal to or less than 150% from a tensile deformation of 400%; and
wherein said blend of polymers in said fiber has a flexural modulus equal to or less than 25,000 psi in/in, wherein said fiber may be elongated to 300% in the substantial absence of breakage.

5. The annealed fiber of claim 4 wherein said FPC is present in said blend from 30–98 weight percent and wherein said SPC is present in said blend from 2–70 weight percent.

6. The annealed fiber of claim 5 wherein;
a) said FPC has
i) a composition distribution such that at least 85 weight percent of the polymer is isolated in two adjacent soluble fractions, each of these fractions has a composition difference of no greater than 10% (relative) of the average weight percent ethylene content of the whole first polymer component;
ii) a melting point less than 100° C.;
iii) a heat of fusion less than 35 J/g;
iv) an alpha-olefin content of less than 20 weight percent, wherein said alpha-olefin is ethylene, propylene is present in said FPC at greater than 75 weight percent, wherein said FPC additionally contains a diene present in said FPC at less than 10 weight percent, the total of said alpha-olefin, said propylene and said diene is 100 weight percent;
wherein said FPC is present in said fiber in the range of from 60–98 weight percent;
b) wherein said SPC has:
i) a melting point above 115° C.;
ii) a heat of fusion above 70 J/g;
iii) said SPC including an alpha-olefin present in the range of from 2–8 weight percent, said propylene making up the balance of said SPC;
wherein said SPC is present in said blend in the range of from 2–40 weight percent;
wherein said fiber exhibits a resistance to set equal to or less than 100% from a 400% tensile deformation; and
wherein said blend of polymers in said fiber has a flexural modulus equal to or less than 20,000 psi in/in.

7. The annealed fiber of claim 4 wherein;
a) said FPC has:
i) a melting point in the range of from 70–25° C.;
ii) a heat of fusion less than 25 J/g;
iii) an alpha-olefin content in the range of from 6–30 weight percent wherein said alpha-olefin is ethylene, wherein said FPC contains a diene present in said FPC at less than 5 weight percent, the total of said alpha-olefin, said propylene and said diene is 100 weight percent;
wherein said FPC is present in said blend from 75–100 weight percent, and
b) wherein said SPC has:
i) a melting point above 130° C.;
ii) a heat of fusion above 80 J/g;
iii) an alpha-olefin present in the range of from 2–6 weight percent, wherein said alpha-olefin is ethylene;
wherein said SPC is present in said blend in the range of from 0–25 weight percent; and
wherein said fiber exhibits a resistance to set that is equal to or less than 80% from a tensile deformation of 400%.

8. The annealed fiber of any of claims 4–7 wherein said fiber further comprises a process oil, present in said fiber in the range of from 1–50 parts per hundred parts the total of said FPC and said SPC.

9. The annealed fiber of any of claims 4–7 wherein said fiber is further manipulated, calendering or by orientation, said orientation being in the range of from 10–400%;
wherein said fiber is annealed for up to 24 hours at up to 140° C.

10. A nonwoven or woven fabric comprising the fiber of any of claims 1–7.

11. A disposable garment comprising the annealed fiber of any of claims 1–7.

12. A diaper comprising the annealed fiber of any of claims 1–7.

13. A process for preparing the soft, set resistant annealed fiber of claim 1 comprising:
(a) polymerizing propylene or a mixture of propylene and one or more monomers selected from $C_2$ or $C_3$–$C_{20}$ alpha olefins in the presence of a polymerization catalyst wherein a substantially isotactic propylene polymer containing at least 90% by weight polymerized propylene is obtained to form a propylene polymer;
(b) polymerizing a mixture of ethylene and propylene in the presence of a chiral metallocene catalyst, wherein a copolymer of ethylene and propylene is obtained comprising up to 35% by weight ethylene, said copolymer containing isotactically crystallizable propylene sequences; and
(c) blending the propylene polymer of step (a) with the copolymer of step (b) to form a blend.

* * * * *